(12) United States Patent
Flynn

(10) Patent No.: US 6,246,561 B1
(45) Date of Patent: Jun. 12, 2001

(54) METHODS FOR CONTROLLING THE PATH OF MAGNETIC FLUX FROM A PERMANENT MAGNET AND DEVICES INCORPORATING THE SAME

(75) Inventor: Charles J. Flynn, Greenwood, MO (US)

(73) Assignee: Magnetic Revolutions Limited, L.L.C, St. Louis, MO (US)

( * ) Notice: Subject to any disclaimer, the term of this patent is extended or adjusted under 35 U.S.C. 154(b) by 0 days.

(21) Appl. No.: 09/127,056

(22) Filed: Jul. 31, 1998

(51) Int. Cl.[7] ................................................. H02K 21/12
(52) U.S. Cl. ............................................. 361/147; 361/210
(58) Field of Search .................................... 361/143, 147, 361/206, 210

(56) References Cited

U.S. PATENT DOCUMENTS

| | | | |
|---|---|---|---|
| 1,161,819 | * 11/1915 | Grob . | |
| 3,135,880 | * 6/1964 | Olson et al. . | |
| 3,184,651 | * 5/1965 | Albosta . | |
| 3,451,055 | * 6/1969 | Pihl . | |
| 3,634,735 | * 1/1972 | Komatsu | 335/234 |
| 3,670,189 | 6/1972 | Monroe | 310/46 |
| 3,683,239 | * 8/1972 | Sturman | 335/170 |
| 3,743,898 | * 7/1973 | Sturman | 335/254 |
| 3,949,250 | 4/1976 | Walker et al. | 310/36 |
| 4,279,008 | * 7/1981 | Del Picchia et al. | 361/194 |
| 4,479,162 | * 10/1984 | Offutt et al. | 361/210 |
| 4,528,533 | 7/1985 | Montagu | 335/230 |
| 4,688,138 | * 8/1987 | Nagata et al. | 361/154 |
| 4,747,010 | * 5/1988 | Bayer | 361/210 |
| 4,965,695 | * 10/1990 | Baumann | 361/142 |
| 5,015,903 | 5/1991 | Hancock et al. | 310/168 |
| 5,155,651 | * 10/1992 | Yoda et al. | 361/144 |
| 5,254,925 | 10/1993 | Flynn | 318/696 |
| 5,268,662 | 12/1993 | Uetsuhara et al. | 335/229 |
| 5,304,881 | 4/1994 | Flynn et al. | 310/156 |
| 5,455,474 | 10/1995 | Flynn | 310/181 |
| 5,463,263 | 10/1995 | Flynn | 310/181 |
| 5,677,580 | 10/1997 | Huang | 310/44 |
| 5,710,493 | 1/1998 | Flynn | 318/254 |
| 5,719,543 | 2/1998 | Berling | 335/229 |
| 5,753,990 | 5/1998 | Flynn et al. | 310/156 |
| 5,818,680 | * 10/1998 | Schmitz et al. | 361/160 |
| 5,822,167 | * 10/1998 | Schmitz | 361/143 |

\* cited by examiner

Primary Examiner—Fritz Fleming
(74) Attorney, Agent, or Firm—Haverstock, Garrett and Roberts LLP

(57) ABSTRACT

A permanent magnet device includes a permanent magnet having north and south pole faces with a first pole piece positioned adjacent one pole face thereof and a second pole piece positioned adjacent the other pole face thereof so as to create at least two potential magnetic flux paths. A first control coil is positioned along one flux path and a second control coil is positioned along the other flux path, each coil being connected to a control circuit for controlling the energization thereof. The control coils may be energized in a variety of ways to achieved desirable motive and static devices, including linear reciprocating devices, linear motion devices, rotary motion devices and power conversion.

42 Claims, 32 Drawing Sheets

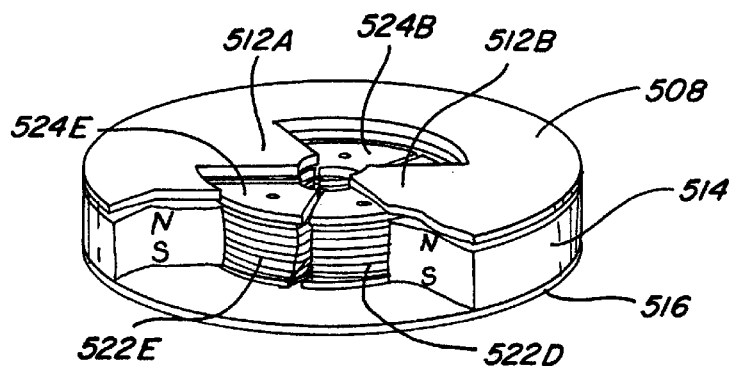
Fig. 20
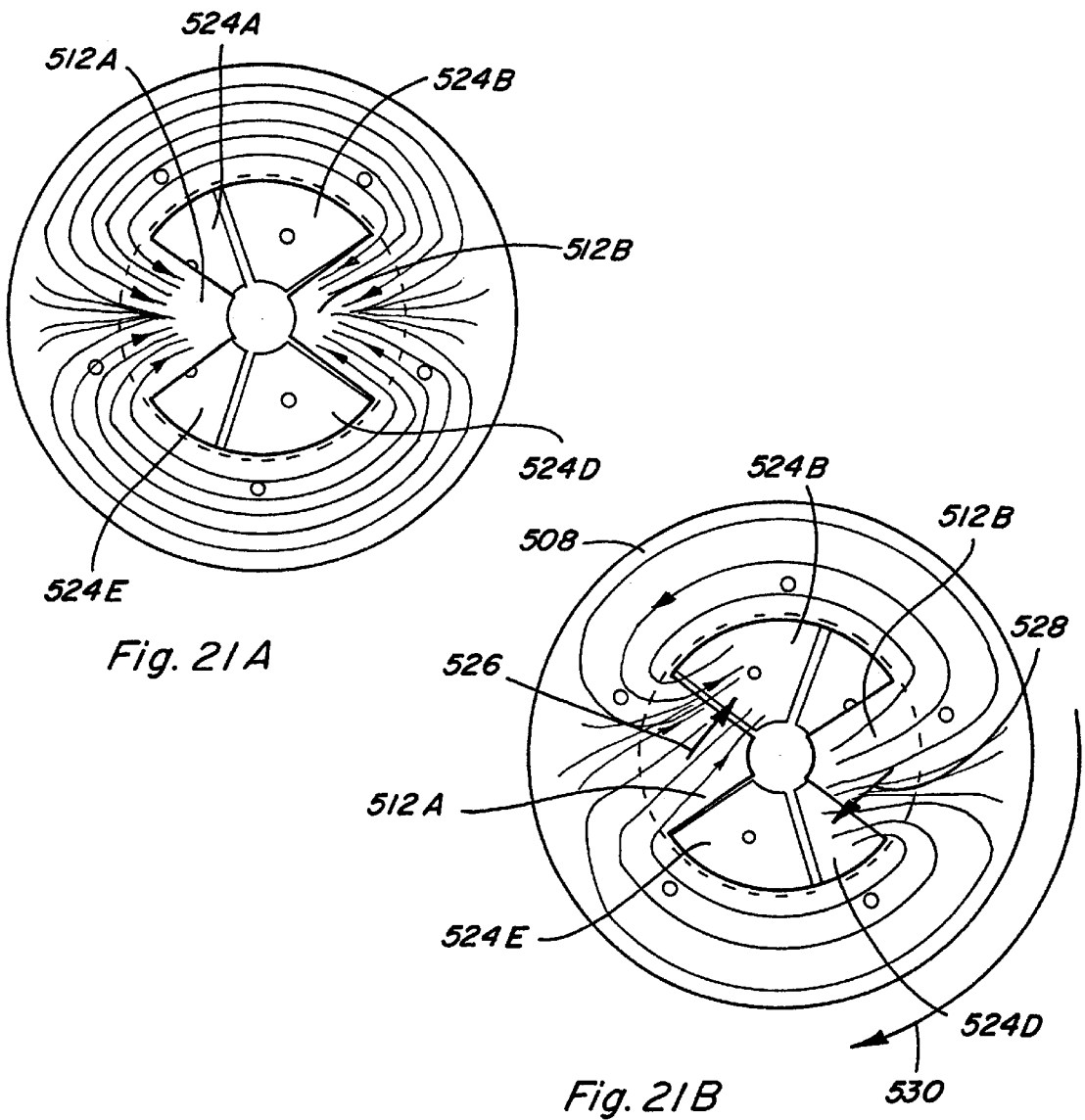
Fig. 21A
Fig. 21B

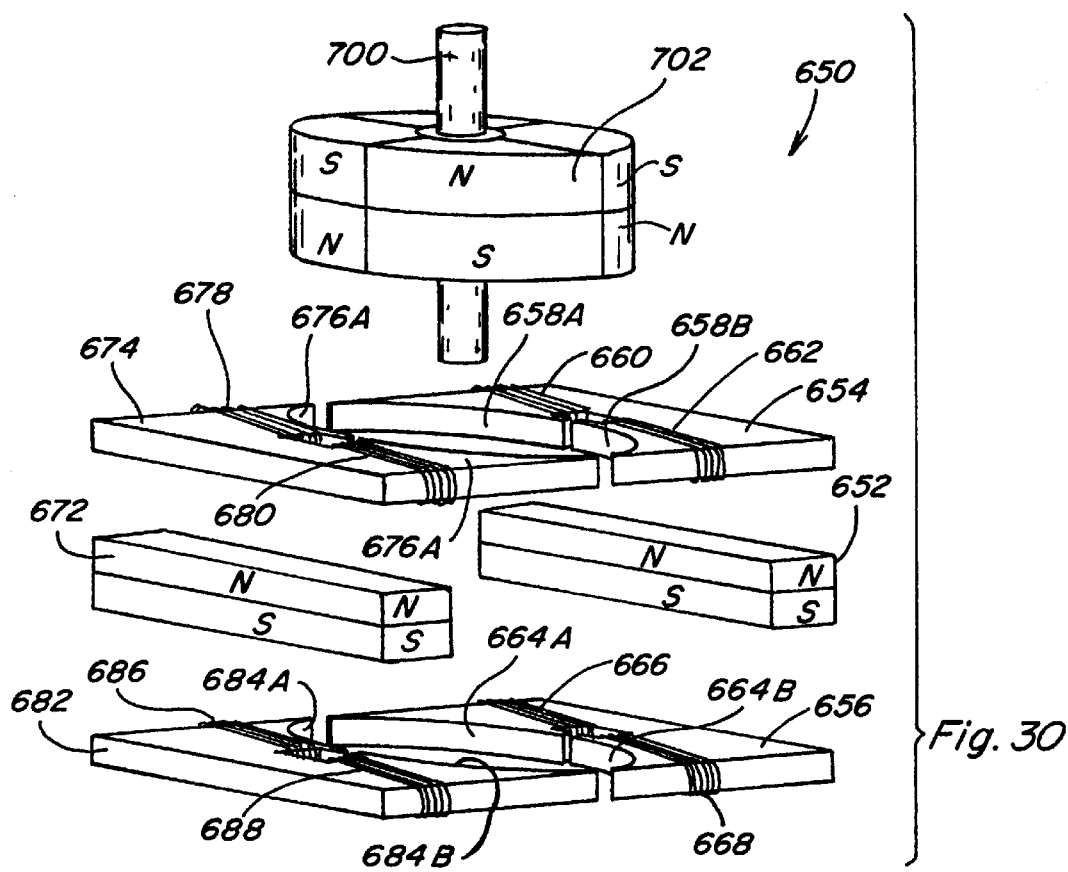
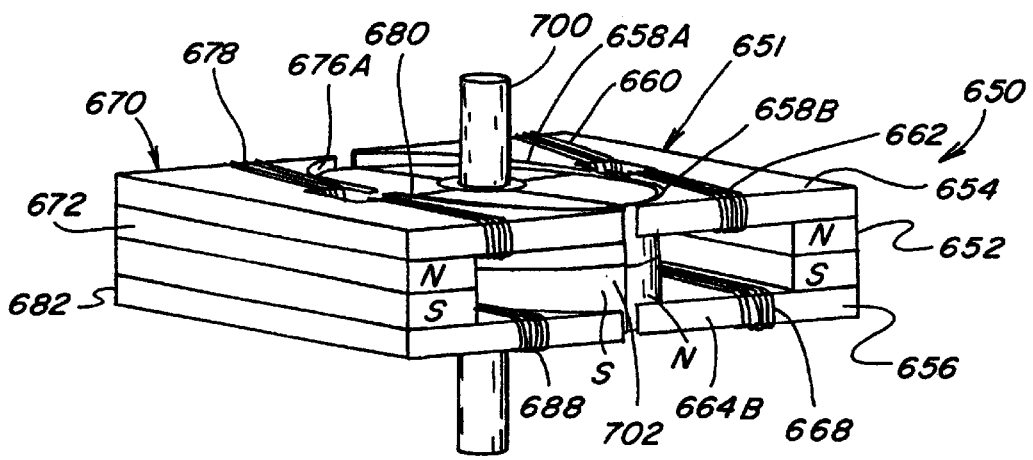
Fig. 30
Fig. 31

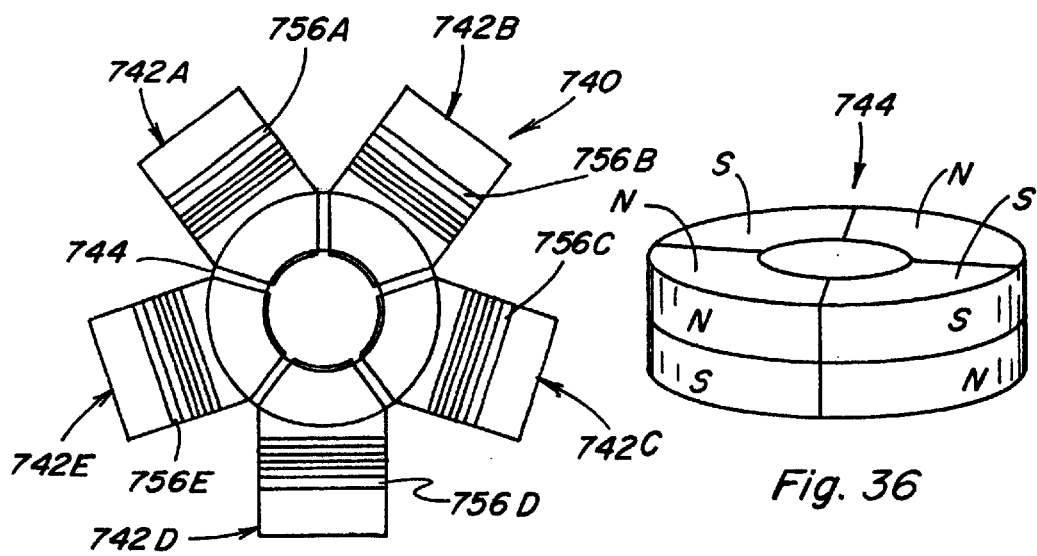
Fig. 35
Fig. 36
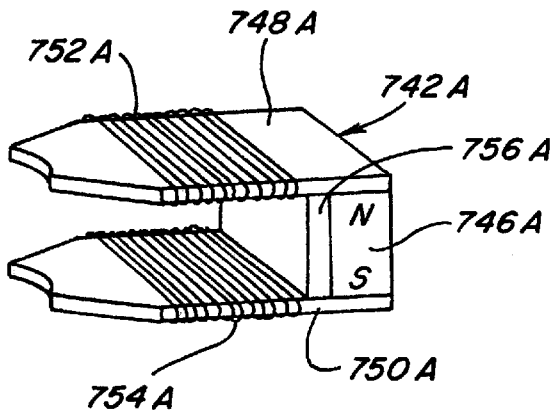
Fig. 37
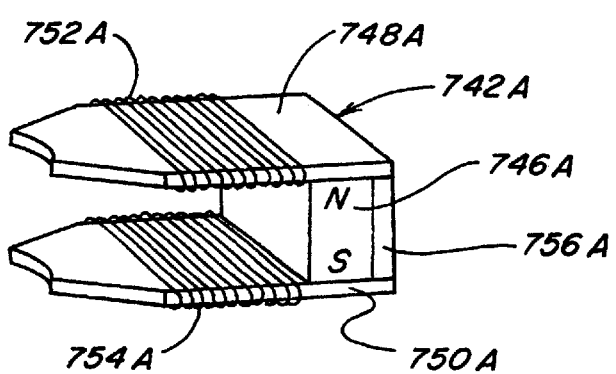
Fig. 38

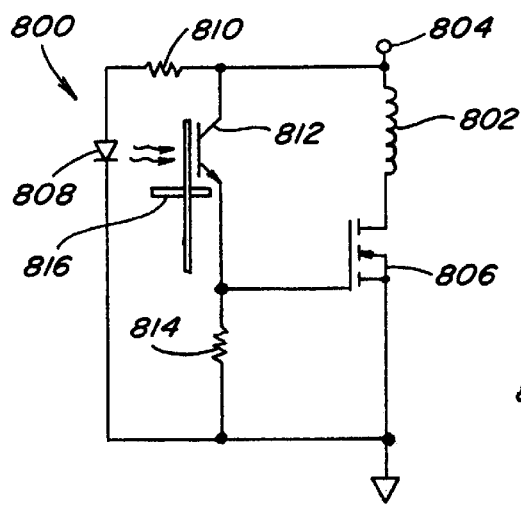
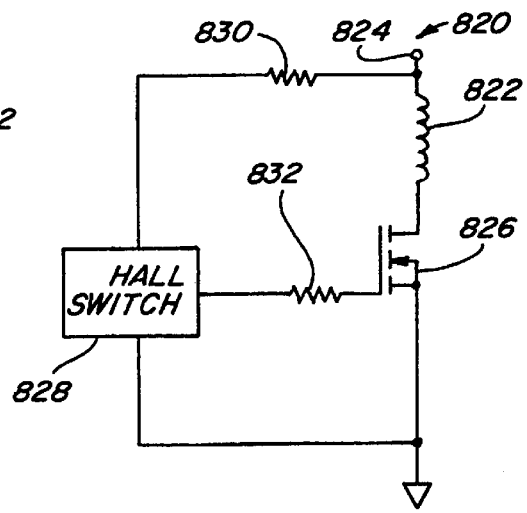
Fig. 40  Fig. 41
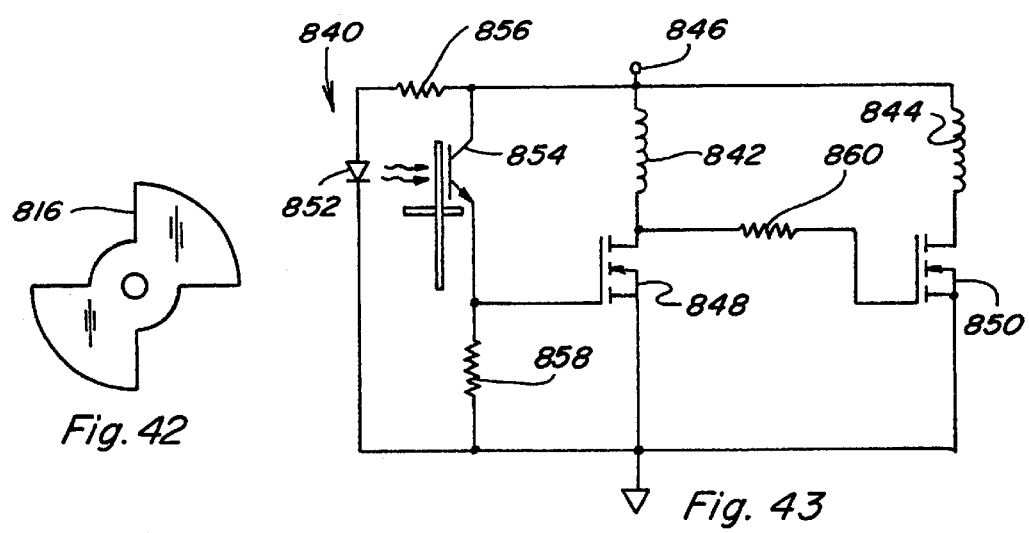
Fig. 42
Fig. 43
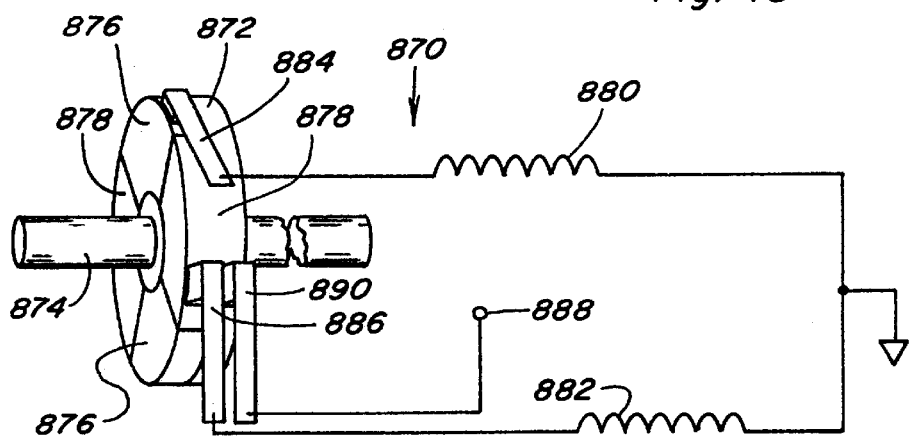
Fig. 44

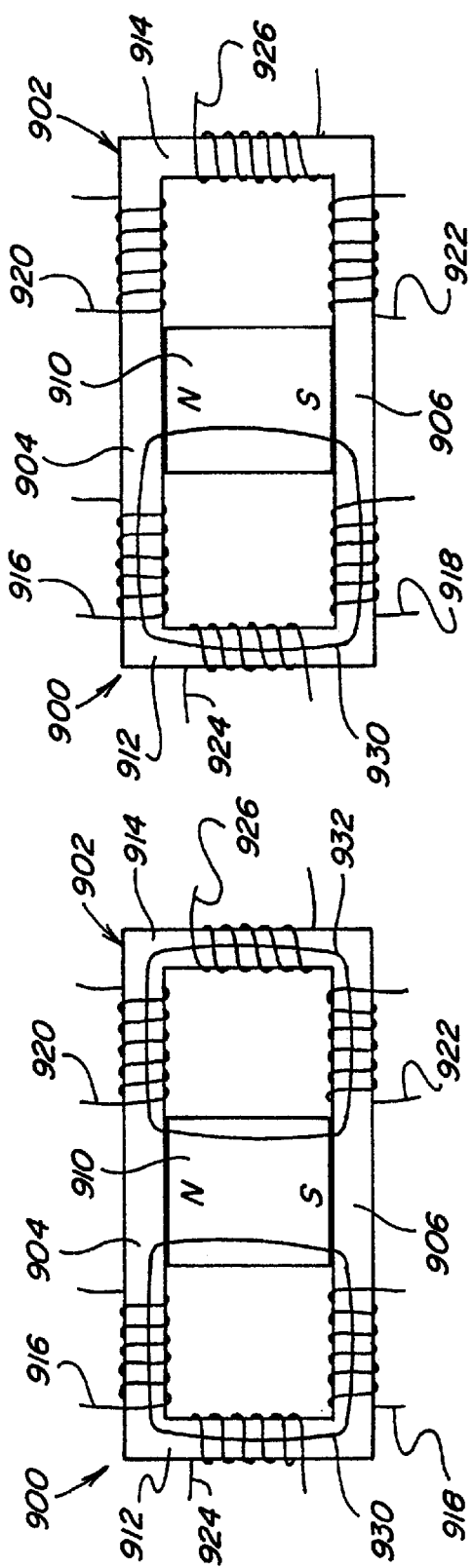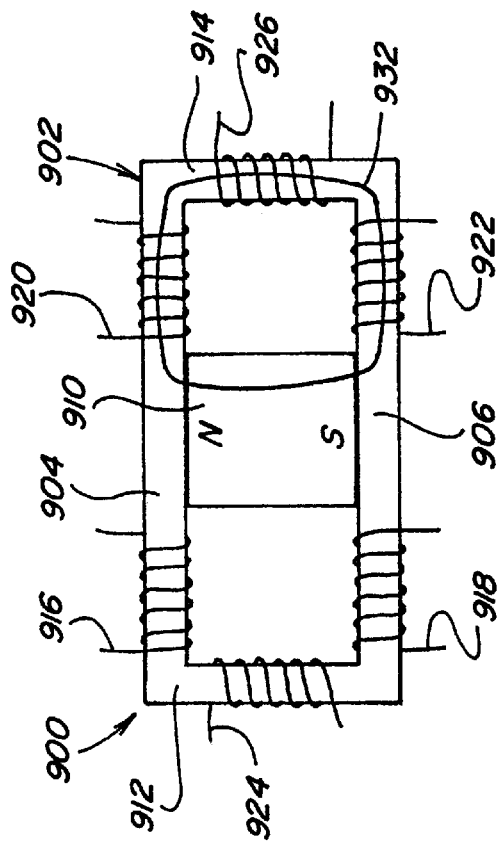
Fig. 45A
Fig. 45B
Fig. 45C

METHODS FOR CONTROLLING THE PATH OF MAGNETIC FLUX FROM A PERMANENT MAGNET AND DEVICES INCORPORATING THE SAME

FIELD OF THE INVENTION

This invention relates generally to permanent magnet devices and more particularly, to a permanent magnet control component in which the flow of flux from a permanent magnet is controlled between two or more flux paths by utilizing timed delivery of electrical signals through one or more coils placed along at least one of the flux paths. Such permanent magnet control components may take on a variety of configurations facilitating use of such components in a variety of applications including applications involving the production of reciprocating, linear, and rotary motion and power conversion. Several novel permanent magnet rotary motion devices of motor constructions which operate by controlling the path of magnetic flux from one or more permanent magnets are described, such permanent magnet rotary motor constructions having increased efficiency and more desirable torque characteristics as compared to many currently used motors.

BACKGROUND OF THE INVENTION

Magnetic force of attraction is commonly used in a variety of types of permanent magnet devices including both linear and rotary motors. In the field of such permanent magnet devices there is a continuous pursuit of increased efficiency and reduced complexity.

Accordingly, an object of the present invention is to provide a permanent magnet control component in which the path of a given level of permanent magnet flux can be controlled by a lesser level of electromagnetic flux.

Another object of the present invention is to provide a permanent magnet control component in which substantially all of the flux from a permanent magnet can be switched between at least two different flux paths of the permanent magnet control component so as to enable useful work in the form of linear, reciprocating, and rotary motion.

Still another object of the present invention is to provide permanent magnet control components and motor constructions in which flux path control is provided by energizing an 1 0 electromagnet to oppose the magnetic flux of one or more permanent magnets.

Another object of the present invention is to provide permanent magnet control components and motor constructions in which flux path control is provided by energizing an electromagnet to aid the magnetic flux of one or more permanent magnets.

Yet another object of the present invention is to provide permanent magnet motor 15 constructions with improved operating characteristics.

SUMMARY OF THE INVENTION

These and other objects of the invention are attained by an apparatus which, in one aspect, is a permanent magnet device, comprising a permanent magnet having north and south pole faces, a first pole piece, a second pole piece, a first control coil, a second control coil, and circuit means, the first pole piece positioned adjacent the north pole face of the permanent magnet and including a first path portion, a second path portion and a third portion, the first path portion extending beyond a perimeter of the north pole face and the second path portion extending beyond the perimeter of the north pole face to define first and second flux paths for magnetic flux emanating from the north pole face of the permanent magnet, the first path portion of the first pole piece connected to the second path portion of the first pole piece by the third portion which extends across the north pole face of the permanent magnet, the second pole piece positioned adjacent the south pole face and including a first path portion and a second path portion, the first path portion extending beyond a perimeter of the south pole face and substantially aligned with the first path portion of the first pole piece, the second path portion extending beyond the perimeter of the south pole face and substantially aligned with the second path portion of the first pole piece, the first control coil positioned around the first path portion of the first pole piece, the second control coil positioned around the second path portion of the first pole piece, the circuit means connected to each of the first control coil and the second control coil to alternatingly energize the first coil and the second coil in a timed sequential manner.

Another aspect of the present invention provides a method for controlling the path of magnetic flux from a permanent magnet which involves placing a first pole piece adjacent a first pole face of the permanent magnet so as to have at least first and second path portions extending beyond a perimeter of the first pole face. A second pole piece is placed adjacent a second pole face of the permanent magnet so as to include at least one portion which substantially aligns with the first and second path portions of the first pole piece. A first control coil is placed along and around the first path portion of the first pole piece and a second control coil is placed along and around the second path portion of the first pole piece. The first control coil is repeatedly energized in a permanent magnet magnetic flux opposing manner so as to prevent magnetic flux of the permanent magnet from traversing the first path portion of the first pole piece, and the second control coil is repeatedly energized in a permanent magnet magnetic flux opposing manner so as to prevent magnetic flux of the permanent magnet from traversing the second path portion of the first pole piece.

Yet another aspect of the present invention provides a method for controlling the path of magnetic flux from a permanent magnet by placing a first pole piece adjacent a first pole face of the permanent magnet so as to have at least first and second path portions extending beyond a perimeter of the first pole face. A second pole piece is placed adjacent a second pole face of the permanent magnet so as to include at least one portion which substantially aligns with the first and second path portions of the first pole piece. A first control coil is placed along and around the first path portion of the first pole piece, and a second control coil is placed along and around the second path portion of the first pole piece. The following steps are alternatingly performed in a repeated manner:
  (i) energizing the first control coil in a permanent magnet magnetic flux aiding manner so as to couple with substantially all magnetic flux of the permanent magnet such that substantially no magnetic flux of the permanent magnet traverses the second path portion of the first pole piece when the first control coil is so energized; and
  (ii) energizing the second control coil in a permanent magnet magnetic flux opposing manner so as to couple with substantially all magnetic flux of the permanent magnet such that substantially no magnetic flux of the permanent magnet traverses the first path portion of the first pole piece when the second control coil is so energized.

A further aspect of the present invention provides method for controlling the path of magnetic flux from a permanent magnet by placing a first pole piece adjacent a first pole face of the permanent magnet so as to have at least first and second path portions extending beyond a perimeter of the first pole face, and placing a second pole piece adjacent a second pole face of the permanent magnet so as to include at least one portion which substantially aligns with the first and second path portions of the first pole piece. A first control coil is placed along and around the first path portion of the first pole piece, and a second control coil is placed along and around the second path portion of the first pole piece. The following steps are alternatingly performed in a repeated manner:

(i) energizing the first control coil in a permanent magnet magnetic flux aiding manner so as to couple with substantially all magnetic flux of the permanent magnet such that substantially no magnetic flux of the permanent magnet traverses the second path portion of the first pole piece when the first control coil is so energized; and (ii) energizing the second control coil in a permanent magnet magnetic flux opposing manner so as to couple with substantially all magnetic flux of the permanent magnet such that substantially no magnetic flux of the permanent magnet traverses the first path portion of the first pole piece when the second control coil is so energized.

BRIEF DESCRIPTION OF THE INVENTION

For a better understanding of the present invention reference may be made to the accompanying drawings in which:

FIGS. 10, 10A–10H are perspective views of various embodiments of permanent magnet 5 control components which include two or more magnetic flux paths;

Figure 19:
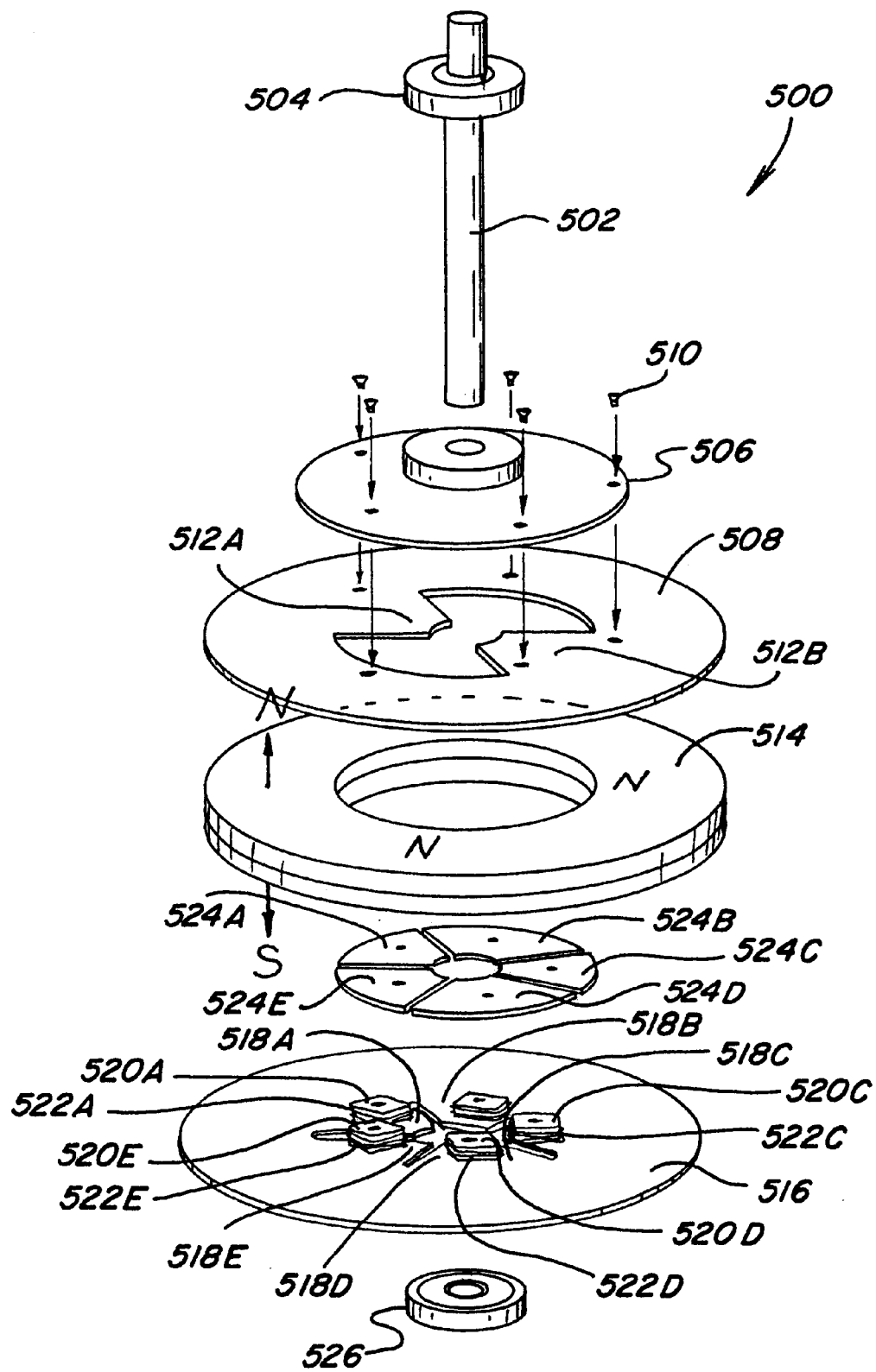
Figure 22:
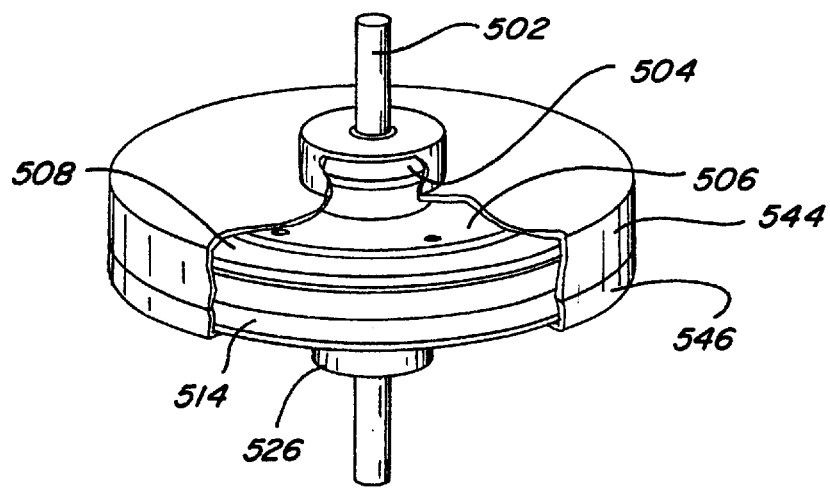
Figure 24:
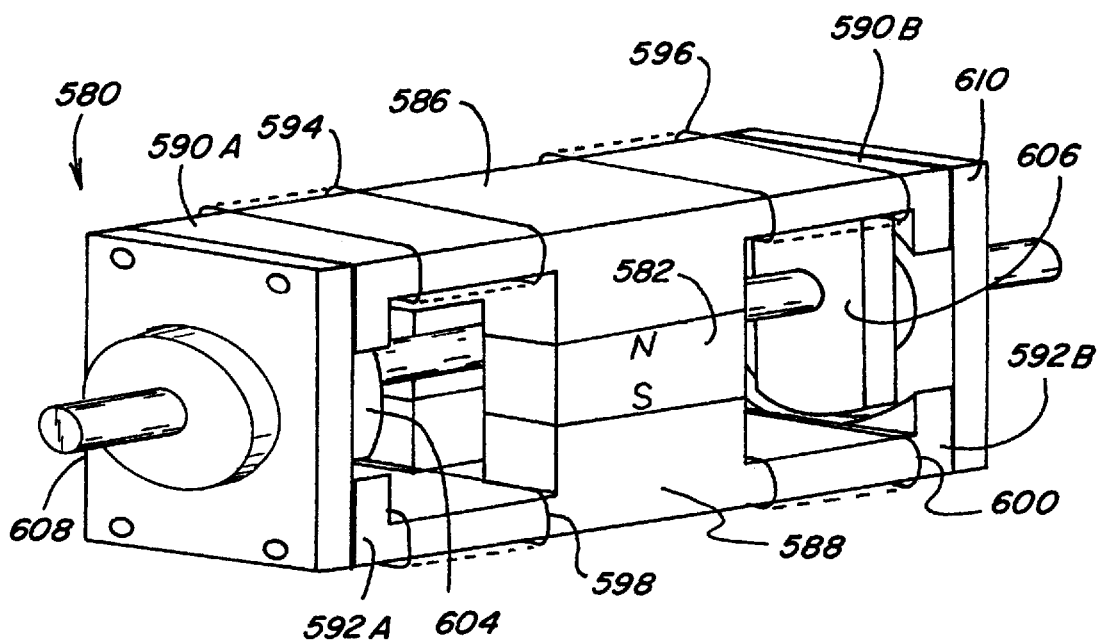
Figure 23:
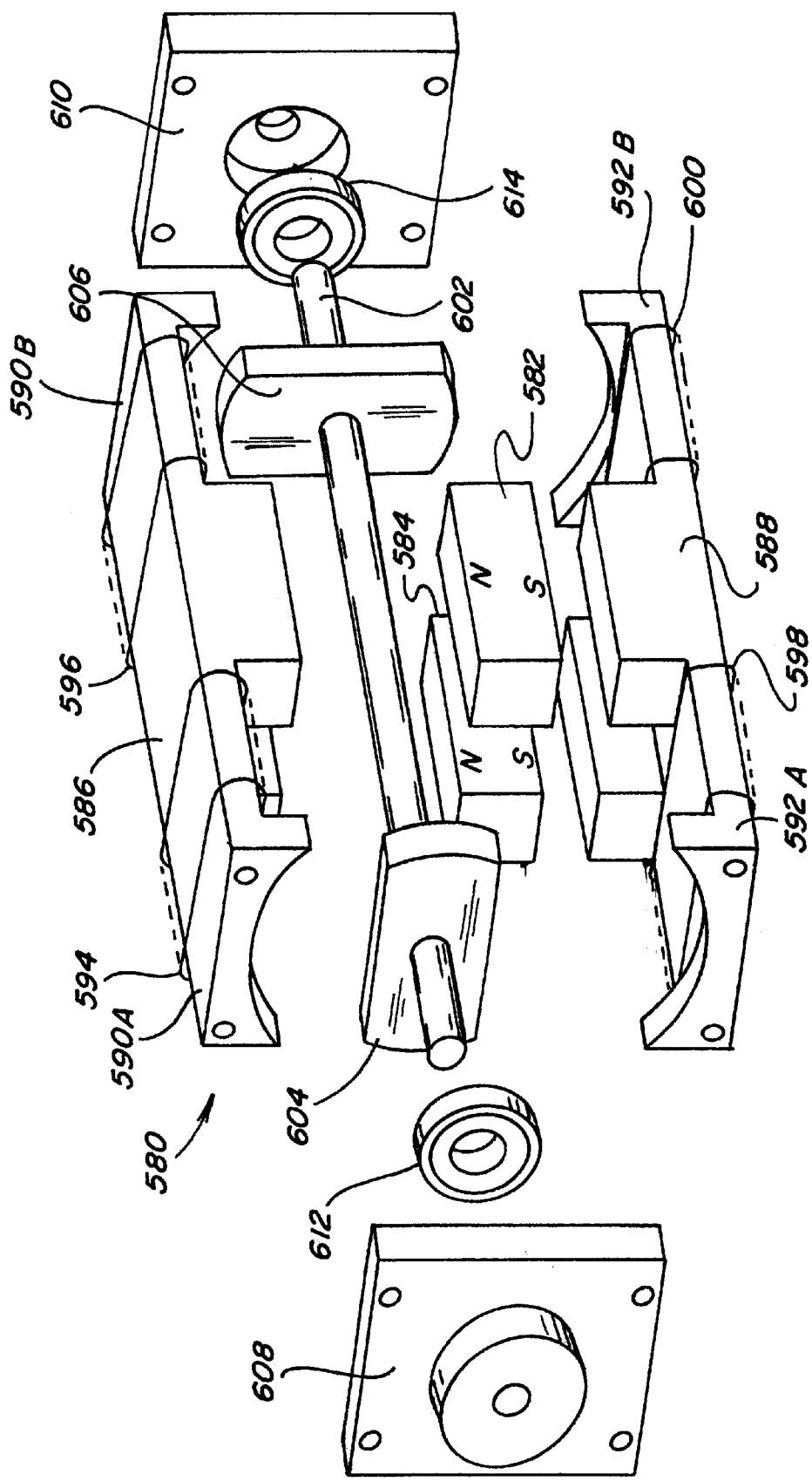
Figures 25A, 25B:
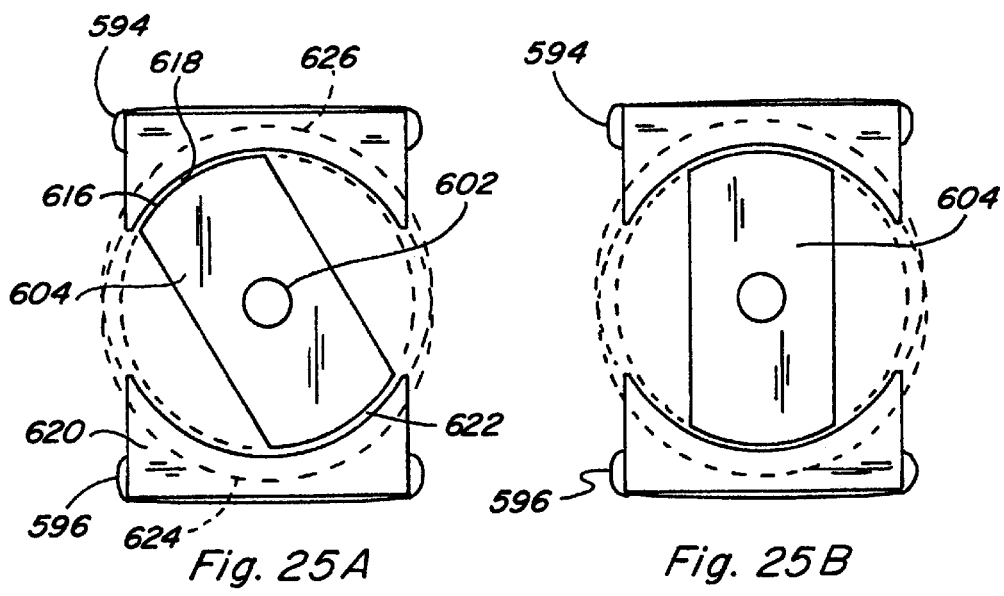
Figures 26, 27:
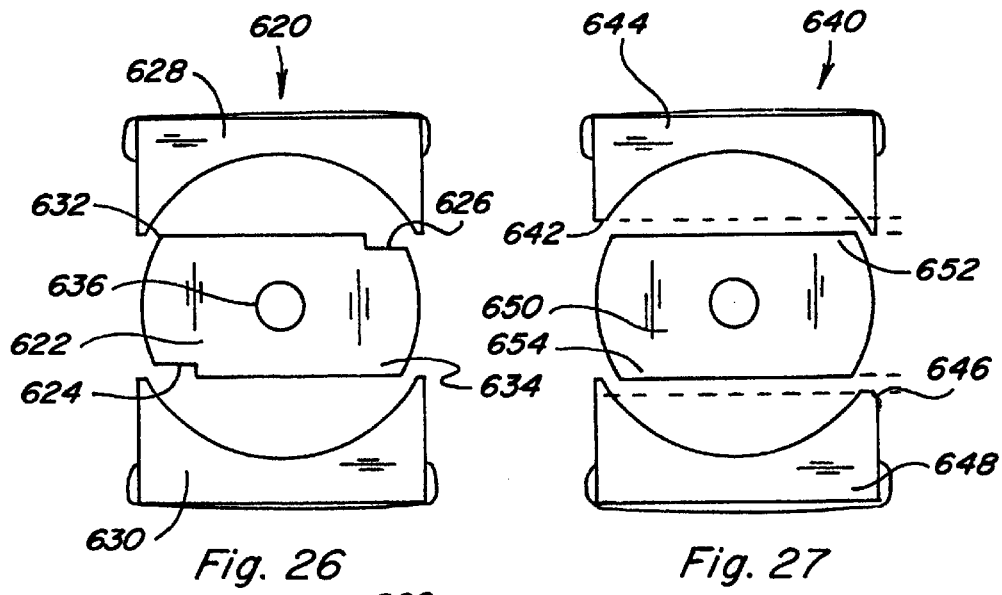
Figure 28:
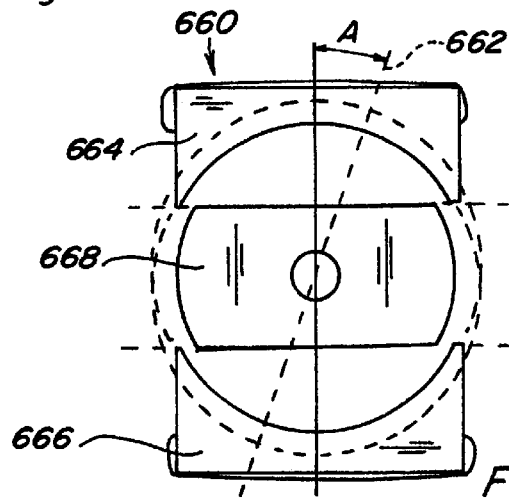
Figure 33:
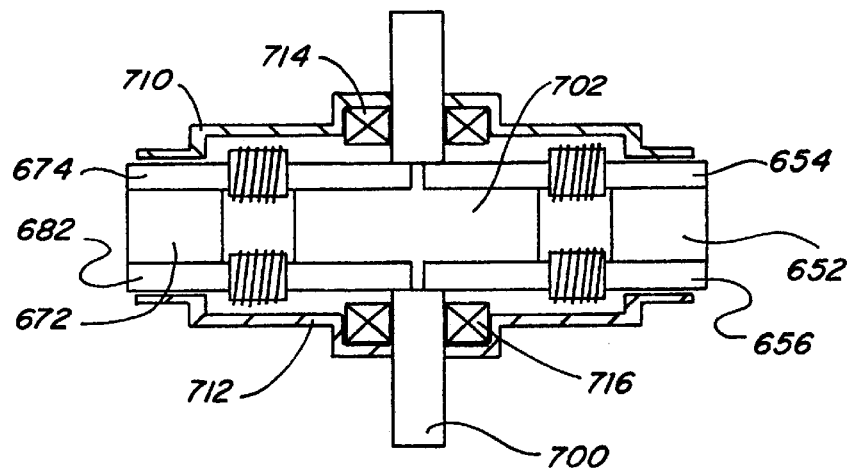
Figure 34:
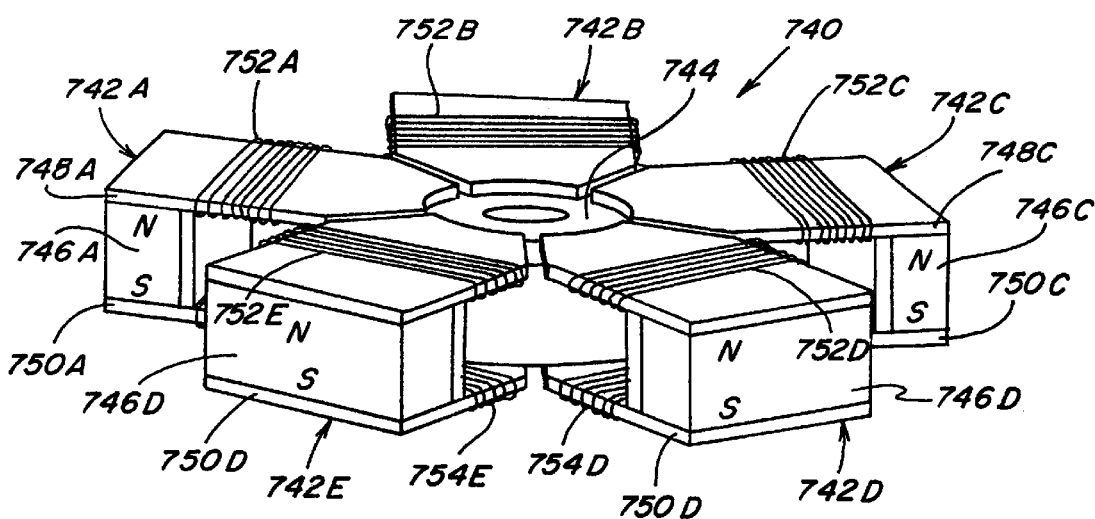
Figure 46:
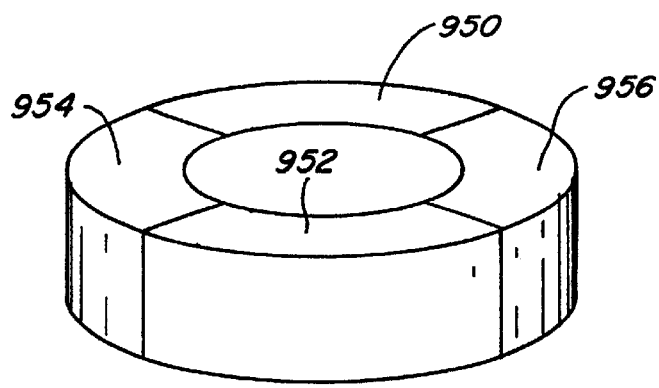
Figure 47:
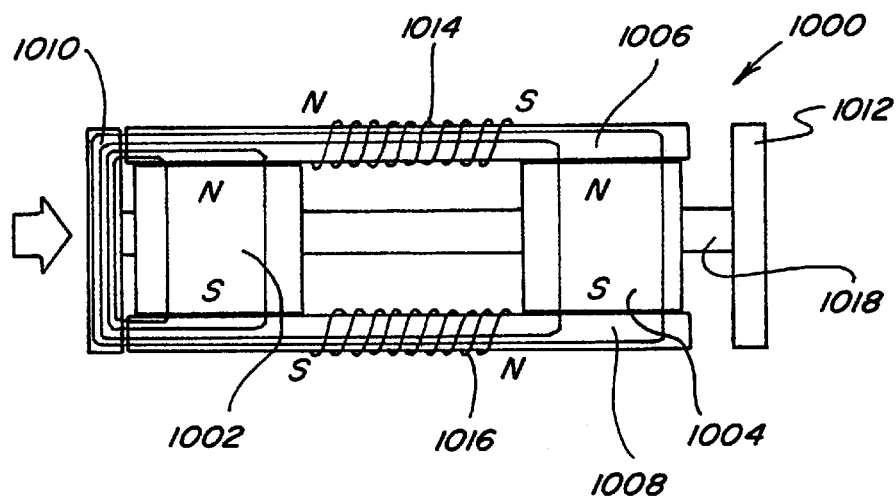
Figure 48:
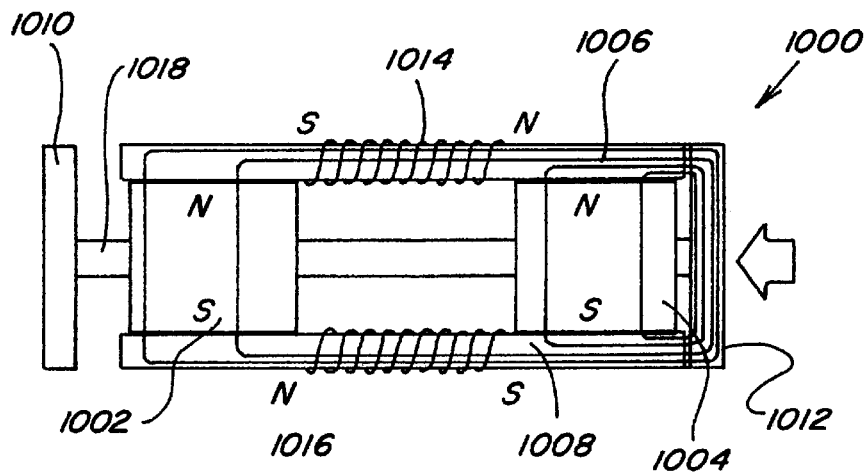
Figure 49:
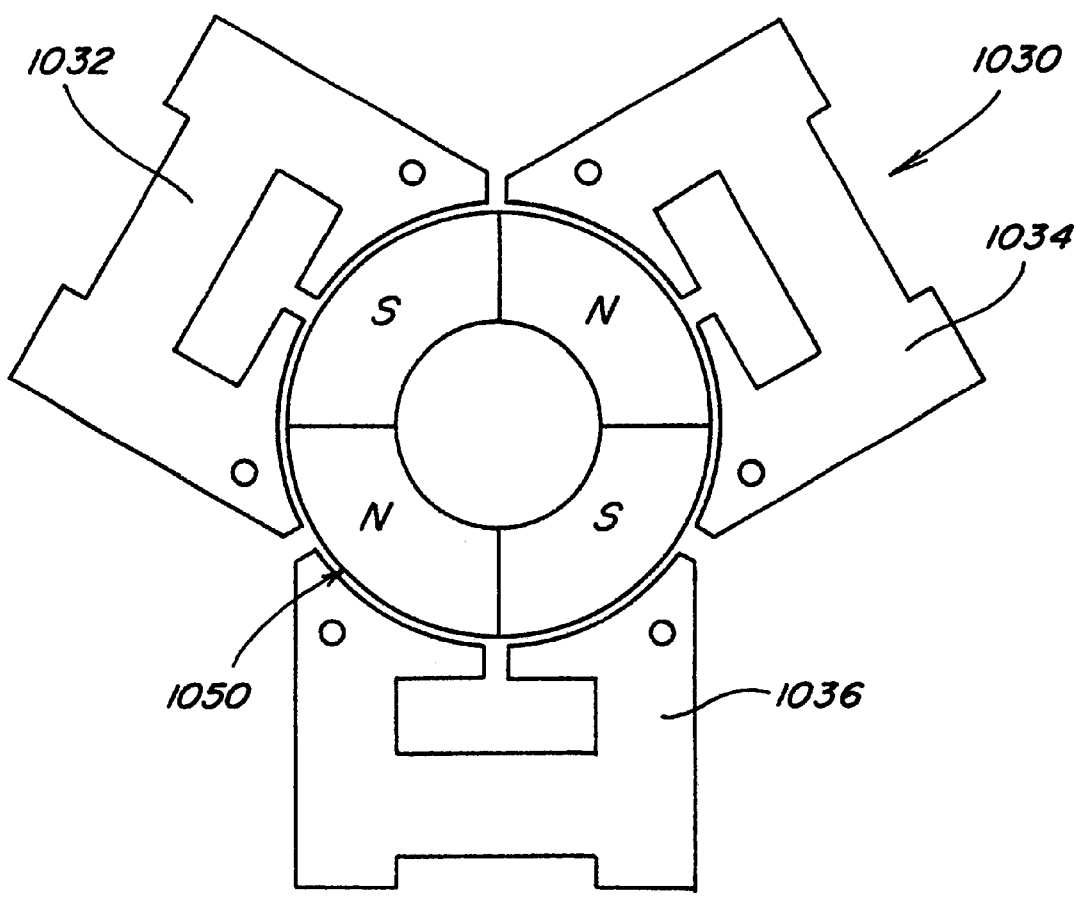
Figure 50:
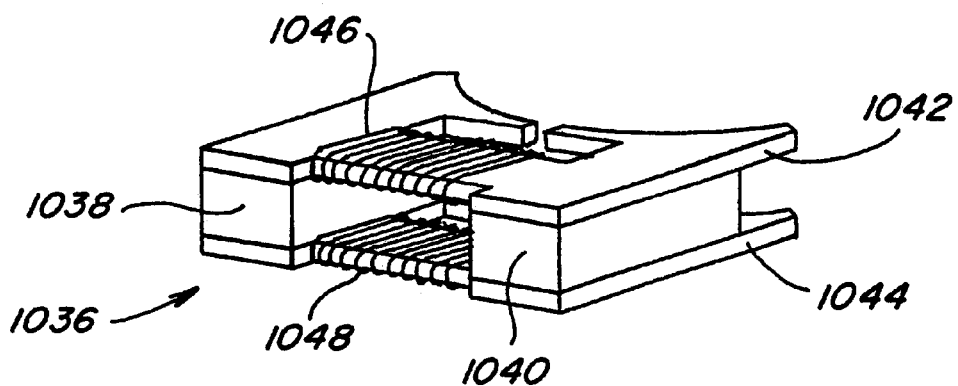

FIGS. 16A–E are a side view of a linear reciprocating device with control coils energized in an exceeding manner;

FIGS. 17A–17D depict another embodiment of a linear reciprocating device;

FIGS. 18A–18E show a linear motion device;

FIG. 19 is an exploded perspective view of a rotary motion device;

FIG. 20 is a partial assembled and cut away view of the rotary motion device of FIG. 19;

FIGS. 21A–21E are top views of the partial assembly of FIG. 20, which views depict rotational motion thereof;

FIG. 22 is an assembled, cut-away view of the rotary motion device of FIG. 19 including a housing;

FIG. 23 is an exploded perspective view of another embodiment of a rotary motion device;

FIG. 24 is a perspective view of the rotary motion device of FIG. 23 as assembled;

FIGS. 25A–25B are end views of the rotary motion device of FIG. 24 with the end cap removed to expose the rotor member;

FIGS. 26–28 show end views of various configurations for skewing the direction of rotation in the rotary motion device of FIG. 24;

FIGS. 29A–29D are end views of the rotary motion device of FIG. 24 illustrating a sequence of rotational movement thereof;

FIG. 30 is an exploded partial perspective view of another embodiment of a rotary motion device;

FIG. 31 is a perspective view of the rotary motion device of FIG. 30 as assembled FIGS. 32A–32D are top views of the rotary motion device of FIG. 31 illustrating rotational movement thereof;

FIG. 33 is a side view of the rotary motion device of FIG. 31 as assembled and including a housing;

FIG. 34 is a perspective view of another embodiment of a rotary motion device;

FIG. 35 is a top view of the rotary motion device of FIG. 34;

FIG. 36 is a perspective view of the permanent magnet rotor member of the rotary motion device of FIG. 34;

FIGS. 37 and 38 show alternative configurations for the control component incorporated into the rotary motion device of FIG. 34;

FIGS. 39A–39D are top views of the rotary motion device of FIG. 34 and depict rotational movement thereof;

FIGS. 40–44 are alternative variations of circuit means for controlling the timed energization of control coils in the various devices of the present invention;

FIGS. 45A–45C and 45X–45Z are side views of two path power conversion devices;

FIG. 46 is a schematic view of the permanent magnet portion of a rotor for use in some embodiments of the present device;

FIGS. 47 and 48 show other embodiments of a linear motion device;

FIG. 49 is a top view of another embodiment of a rotating motor like construction; and FIG. 50 is a schematic view of one of the three stator portions of the device shown in FIG. 49.

DETAILED DESCRIPTION OF THE DRAWINGS

Figure 1:
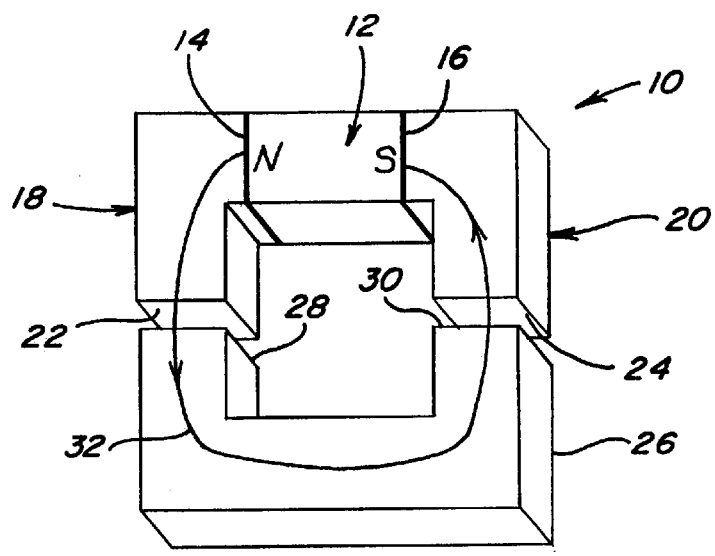
FIG. 1 is a perspective view of a magnetic device in which the magnetic flux from a magnetic member traverse a single path to produce a coupling force.

Referring now to the drawings, FIGS. 1–4 are provided to facilitate an understanding of various aspects or features of the technology utilized in the present invention. FIG. 1 depicts a device 10 having a magnetic flux producing member 12 which may be a permanent magnet or electromagnet with magnetic poles 14 and 16 as shown. Pole pieces 18 and 20 are positioned adjacent respective poles 14 and 16 to provide a path for the magnetic flux of member 12. Each pole piece 18 and 20 includes a respective pole piece end face 22 and 24. As used throughout this specification it is understood that a pole piece, regardless of its shape or size, is preferably formed of soft iron, steel or some other magnetic material, with the preferred material being one which provides low reluctance, exhibits low hysterisis, and has a high magnetic flux density capability. Accordingly, the various pole pieces disclosed and described herein could likewise be of laminate type construction. Referring again to FIG. 1 an armature 26, also formed of magnetic material, is shown with end faces 28 and 30 which are positioned and sized for being placed adjacent pole piece end faces 22 and 24, such that when so positioned a substantially continuous low reluctance path 32 is provided for magnetic flux from north pole 14, through pole piece 18, through armature 26, through pole piece 16, and to south pole 16. The magnetic flux traveling along such path 32 results in a force which tends to hold armature 26 in position adjacent pole piece end faces 22 and 24. The resulting magnetic coupling or holding force F provided between adjacent pole piece end face 22 and armature end face 28, and between adjacent pole piece end face 24 and armature end face 30, can be approximated by the following equation:

$$F = B^2 A / 2\mu_0,$$

where B is the magnetic flux density passing through the adjacent end faces and where A is the surface area of the adjacent end faces. Assuming B uniform throughout flux path 32 and the area A of all end faces 22, 24, 28, and 30 to be the same, the total holding force $F_{T26}$ of armature 26 against pole pieces 18 and 20 will be:

$$F_{T26} = B^2 A / \mu_0.$$

Figure 2:
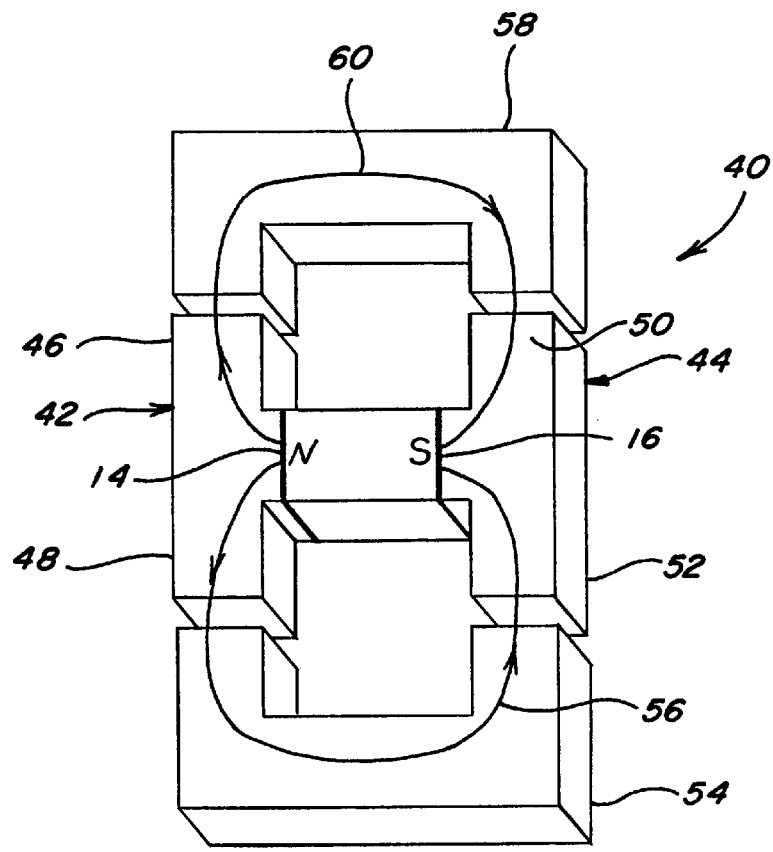
FIG. 2 is a perspective view of a magnetic device in which the magnetic flux from a magnetic member splits between two paths.

In FIG. 2 a device 40 having the same magnetic flux producing member 12 with magnetic poles 14 and 16 is shown. Pole pieces 42 and 44 are positioned adjacent respective pole faces 14 and 16 to provide two paths, as opposed to one above, for the magnetic flux of member 12. In particular, pole piece 42 includes a first path portion 46 extending beyond a perimeter of north pole face 14 in one direction and a second path portion 48 extending beyond the perimeter of north pole face 14 in another direction. Similarly, pole piece 44 includes a first path portion 50 extending beyond the perimeter of south pole face 16 in one direction and a second path portion 52 extending beyond the perimeter of south pole face 16 in another direction. Each pole piece path portion 46, 48, 50, 52 includes a respective end face. A first armature 54 is positionable adjacent the end faces of pole piece path portions 48 and 52 to provide a first magnetic flux path 56 and a second armature 58 is positionable adjacent the end faces of pole piece path portions 46 and 50 to provide a second magnetic flux path 60. If the flux carrying area along flux paths 56 and 60 is the same as the flux carrying area along flux path 32 of FIG. 1, the magnetic flux density along each flux path 56 and 60 will be one-half the magnetic flux density along flux path 32 of FIG. 1 because the same amount of flux is split between two like paths. The effect of dividing a given amount of magnetic flux along two like flux paths instead of along one flux path can be seen by examining the holding force on armature 54 as compared to the holding force on armature 26 of FIG. 1. As already noted the magnetic flux density along path 56 will be one-half that along flux path 32 and thus the total holding force $F_{T54}$ can be determined as:

$$F_{T54} = (B/2)2A/\mu_0 = B^2 A / 4\mu_0 = F_{T26}/4.$$

It is therefore seen that dividing the same amount of magnetic flux along two flux paths rather than along one flux path reduces the magnetic holding or coupling force on an armature by one-fourth rather than one-half as might have been expected. This unexpected magnetic holding or coupling force differential, resulting from multiple flux paths, can provide advantageous properties in linear, reciprocating, and rotary motion devices.

Figure 3:
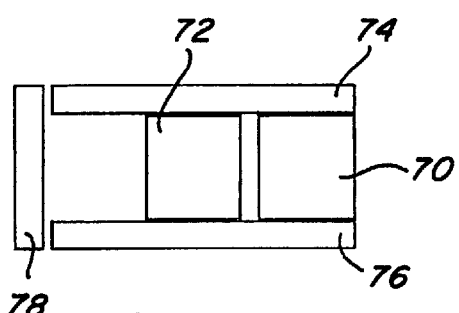
FIG. 3 is a side view of two magnetic members arrange in parallel between pole pieces.
Figure 4:
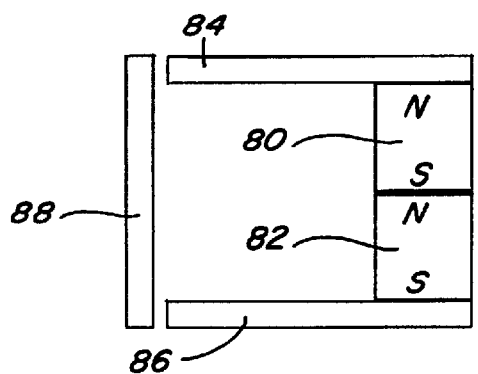
FIG. 4 is a side view of two magnetic members arranged in series between pole pieces.

Referring now to FIGS. 3–4, the behavior of multiple magnetic flux sources arranged in parallel and series is described as compared to a single flux source. When identical flux sources or magnetic flux producing members 70 and 72 are positioned in parallel as shown in FIG. 3 with pole pieces 74 and 76 positioned adjacent the poles thereof to provide a flux path through armature 78, the flux density B through armature 78 is double what the flux density would be if only one magnetic flux producing member were present. However, the field intensity H resulting from the two members 70 and 72 remains unchanged. This result holds true regardless of whether members 70 and 72 are both permanent magnets, are both electromagnets, or are a combination of one permanent magnet and one electromagnet. On the other hand, the properties resulting from magnetic flux producing members 80 and 82 arranged pole-to-pole in series between pole pieces 84 and 86, with armature 88, as shown in FIG. 4, will vary depending on the nature of the members 80 and 82.

In a first case, if both members 80 and 82 are permanent magnets, the magnetic field intensity H resulting from the two permanent magnets will be double that of one permanent magnet and the flux density B through armature 88 will be the same as what the flux density would be if only one permanent magnet type member were present.

In a second case, if both members 80 and 82 are electromagnets, the field intensity H again doubles and the flux density B increases according to the B/H curve or relationship of the pole piece 84, 86 and armature 88 materials.

In a third case, if member 80 is a permanent magnet and member 82 is an electromagnet, the field intensity H again doubles, but, since the permanent magnet is near flux density saturation $B_r$ the flux density can only be increased from $B_r$ to $B_{max}$ of the permanent magnet. At the point where electromagnet-type member 82 contacts permanent magnet-type member 80 the flux from the electromagnet-type member 82 couples with the flux of the permanent magnet-type member 82 until the flux density through permanent magnet-type member 80 reaches $B_{max}$. At that point additional flux from electromagnet-type member 82 does not contribute to the flux density along the flux path unless a bypass path around the permanent magnet-type member is provided. Use of such bypass paths will be described hereinbelow.

Figure 5:
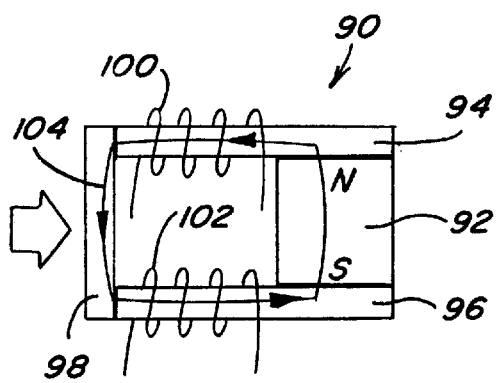
FIGS. 5–6 are side views of a permanent magnet device including a permanent magnet having pole pieces positioned against the pole faces thereof and including a movable armature.
Figure 6:
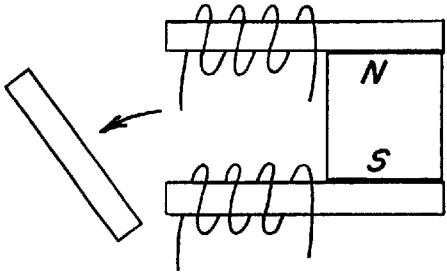

Controlling the flow of flux along both one and multiple flux paths is best described with reference to FIGS. 5–9. In FIGS. 5 and 6 a permanent magnet device 90 including a permanent magnet 92 having pole pieces 94 and 96 positioned adjacent the pole faces thereof and an armature 98 completing a low reluctance path 104 from pole to pole is shown. Control coils 100, 102 are positioned along path 104. When control coils 100, 102 are not energized, the magnetic flux of permanent magnet 92 follows path 104 as shown and armature 98 is held in place against pole pieces 94, 96 due to the resulting magnetic coupling forces. However, if coils 100, 102 are energized to provide an equal but opposing magnetic flux to that of permanent magnet 92, the result is that the magnetic flux of permanent magnet 92 is blocked and no magnetic flux traverses the path which includes armature 98 and therefore no magnetic coupling forces act on armature 98 allowing it to fall away as shown in FIG. 6. The permanent magnet device 90 is useful, although as will become apparent below, it is more advantageous to provide multiple flux paths rather than one.

Figure 7:
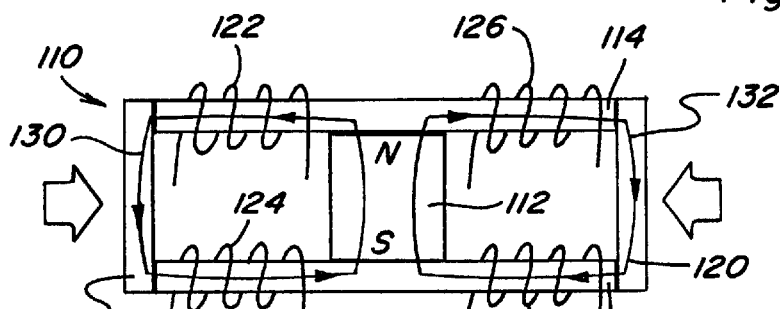
FIGS. 7–9 are side views of a permanent magnet device including a permanent magnet having pole pieces positioned against the pole faces thereof to provide two magnetic flux paths and including a movable armature positionable along each magnetic flux path.

In this regard, in FIG. 7 a permanent magnet device 110 includes a permanent magnet 112 having pole pieces 114, 116 positioned adjacent the pole faces thereof with armatures 118, 120 completing two low reluctance paths 130, 132 from pole to pole thereof. Control coils 122, 124 are positioned along path 130 and control coils 126, 128 are positioned along path 132. The two paths provided are assumed to be of equal reluctance. With no coils energized, the magnetic flux of permanent magnet 112 divides equally along flux path 130 and along flux path 132 such that both armatures 118, 120 are subjected to a magnetic coupling force which holds them in place against pole pieces 114, 116.

Figure 8:
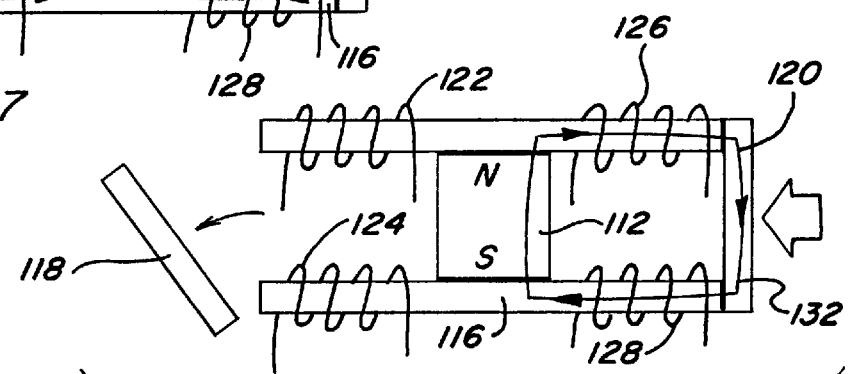

If coils 122, 124 are energized to provide a magnetic flux equal to but opposing the magnetic flux which travels along flux path 130 from permanent magnet 112 when no coils are energized, the result is that the magnetic flux of permanent magnet 112 is blocked and no magnetic flux traverses the path which includes armature 118 and therefore no magnetic coupling forces act on armature 118 allowing it to fall away as shown in FIG. 8. Further, the magnetic flux traversing path 132 will be double that of when no coils are energized and therefore the magnetic coupling force on armature 120 will be about four (4) times that of when no coils are energized. By energizing coils 126, 128 in an opposing manner a similar result would be achieved such that armature 120 would fall away and such that the magnetic coupling force on armature 118 would be increased.

Figure 9:
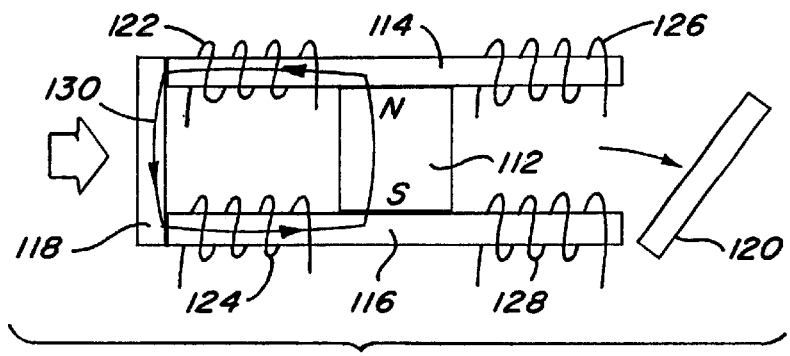

If coils 122, 124 are energized to provide a magnetic flux equal to and aiding the magnetic flux which travels along flux path 130 when no coils are energized, the result is that the control coils couple completely with the magnetic flux of permanent magnet 112 and no magnetic flux traverses the path which includes armature 120 and therefore no magnetic coupling forces act on armature 120 allowing it to fall away as shown in FIG. 9. Further, the magnetic flux traversing path 130 will be double that of when no coils are energized and therefore the magnetic coupling force on armature 118 will be about four (4) times that when no coils are energized. By energizing coils 126, 128 in an aiding manner a similar result would be achieved such that armature 118 would fall away and the magnetic coupling force on armature 120 would be increased.

Based on the foregoing it is seen that the full magnetic coupling force available from the permanent magnet 112 can be switched from one path to another path by the application of one half the power it would require for a coil alone to produce the same magnetic flux along one path. The ability to easily switch the full magnetic coupling force from one path to another allows for efficient reciprocating, linear, and rotary motion and power conversion to be achieved.

Figure 10:
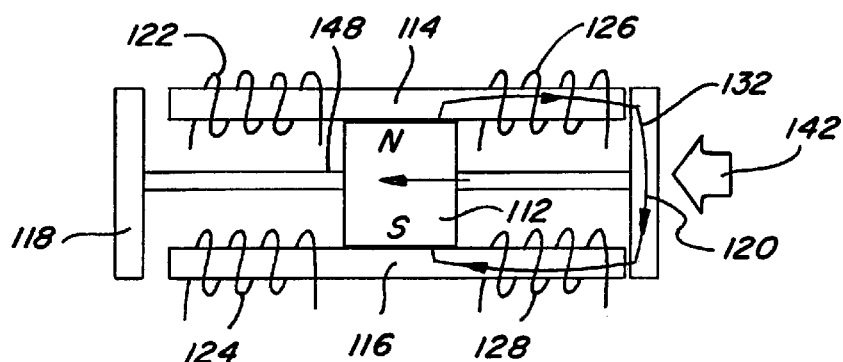
Figure 11:
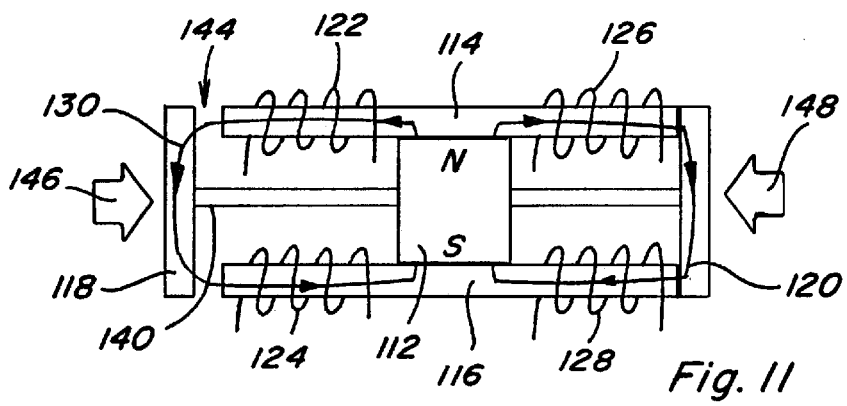
FIGS. 11, 11A–11F are side views of a permanent magnet device including a permanent magnet having pole pieces positioned against the pole faces thereof and including a movable armature and a permanent bypass extending between the pole pieces.

The basic device utilized to achieve permanent magnet flux division and to control such permanent magnet flux division is defined herein as a "permanent magnet control component," various configurations of which are shown by way of example only, and not by way of limitation, in FIGS. 10A–10F. FIG. 10A depicts a permanent magnet control component 150 in which pole pieces 152 and 154 are positioned adjacent the pole faces of permanent magnet 156 to provide two magnetic flux paths extending from opposite sides of permanent magnet. Control coils 158 are positioned along each path. FIG. 10B depicts a permanent magnet control component 160 in which pole pieces 162 and 164 are positioned against the pole faces of permanent magnet 166 to provide two spaced, adjacent magnetic flux paths extending from the same side of permanent magnet 166. Control coils 168 are positioned along each path. FIG. 10C depicts a permanent magnet control component 170 in which pole pieces 172 and 174 are configured so as to be positioned adjacent the pole faces of permanent magnet 176 so as to provide four flux paths, each flux path extending in a respective direction from permanent magnet 176. Control coils 178 are also positioned along each path. FIG. 10D depicts another four path configuration of a permanent magnet control component 180 in which pole pieces 182, 184 are configured and positioned to provide four flux paths for permanent magnet 186, with a pair of spaced, adjacent flux paths extending from each side of permanent magnet 186. Control coils 188 are positioned along each path. FIG. 10E depicts another four path configuration of a permanent magnet control component 190 in which all four flux paths formed by pole pieces 192, 194 extend from one side of permanent magnet 196. Again, control coils 198 are positioned along each flux path. FIG. 10F still further depicts a four path configuration of a permanent magnet control component 200 in which pole pieces 202, 204 extend to one side of permanent magnet 206, with pole piece 202 defining four flux paths and with pole piece 204 including a continuous return path. Control coils 208 are positioned along each path of pole piece 202. Many other variations are possible.

Accordingly, it is seen that a variety of different configurations of permanent magnet control components in accordance with the present invention are possible. The important considerations for division of permanent magnet flux in such permanent magnet control components include extending each pole piece to or beyond the outer perimeter of the pole face of the permanent magnet in each region where a flux path is intended and assuring that the pole face of the permanent magnet intersects each of the flux paths. It is not necessary for each pole piece to include the same number of path portions extending beyond the perimeter of the respective permanent magnet pole face as noted with reference to permanent magnet control component 200. Although two control coils are shown along each of the flux paths in FIGS. 10A–10E it is apparent from component 200 in FIG. 10F that one control coil positioned along a flux path is generally sufficient for purposes of the present invention. Further, although in the illustrated configurations each pole piece is positioned to contact a respective pole face of the permanent magnet, a small spacing between a pole piece and its adjacent permanent magnet pole face could be provided, particularly in applications where relative movement between the subject pole piece and the permanent magnet will occur.

In its simplest form a two path permanent magnet control component only requires one control coil positioned along one of the control paths to permit the magnetic flux of a permanent magnet to be switched between the two paths. In particular, a side view of such a two path component 210 is shown in FIG. 10G and includes a permanent magnet 211 pole pieces 212 and 213, and control coil 214 which may be connected to a suitable control circuit. By alternating energizing control coil 214 in an opposing manner and an aiding manner the magnetic flux of permanent magnet can be switched between the path including armature 215 and the path including armature 216. When control coil 214 is energized in an opposing manner the magnetic flux will traverse the path including armature 215 and when control coil 214 is energized in an aiding manner the magnetic flux will traverse the path including armature 216. Control coil 214 could also be placed at anyone of positions 217, 218, or 219 to achieve the flux path switching. Further, in the two coils embodiment shown in FIG. 10H control coil 217 is added. In such a device flux switching can be achieved by simultaneously energizing control coil 214 in a flux aiding manner and control coil 217 in a flux opposing manner, and by then simultaneously reversing the energization of the respective control coils 214 and 217.

Figure 11A:
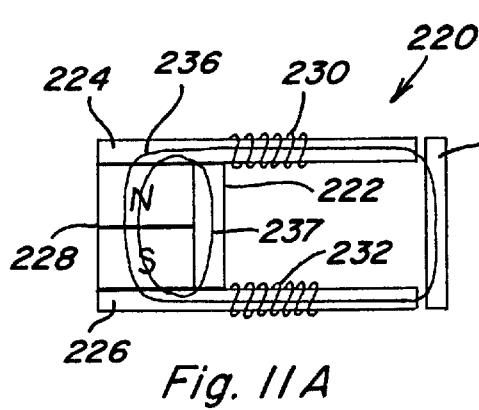
Figure 11D:
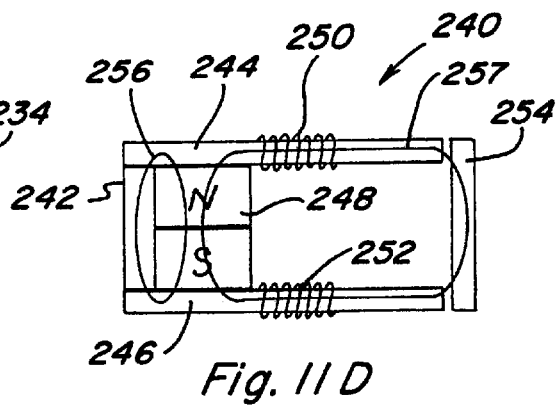
Figure 11B:
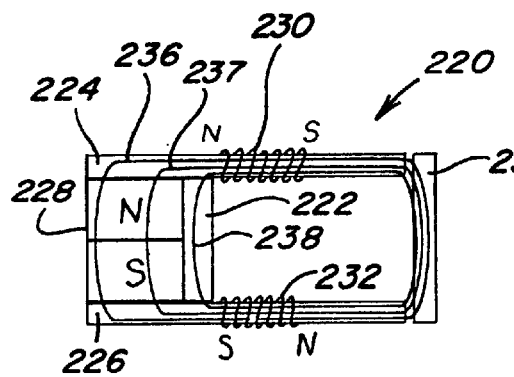
Figure 11E:
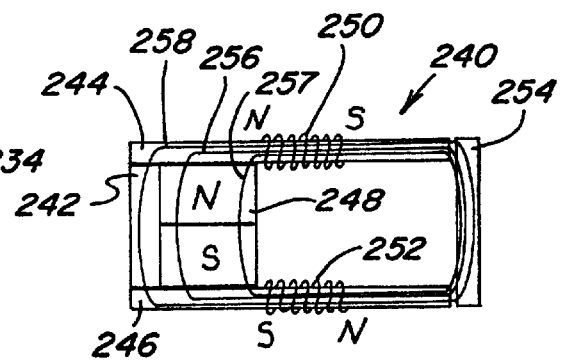
Figure 11C:
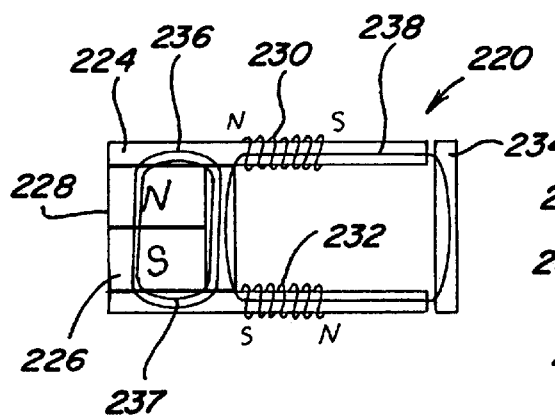

Reference is made to FIGS. 11A–11F which depict devices similar to that of FIGS. 5–6 except that a bypass, formed of magnetic material, is provided in each case. In device 220 of FIGS. 11A–11C a bypass 222 is provided from pole piece 224 to pole piece 226 and is located between permanent magnet 228 and control coils 230, 232, with armature 234 located adjacent the ends of pole pieces 224, 226. In FIG. 11A with no coil energization, magnet flux components 236 and 237 travel as shown. When coils 230 and 232 are energized in an aiding or adding manner as in FIG. 11B, the result is permanent magnet magnetic flux components 236 and 237 traveling as shown, and with the added magnetic flux component 238 from coils 230 and 232 also traveling as shown. Thus, in device 220 energizing the coils in an aiding manner results in an increased magnetic coupling force on armature 234. In FIG. 11C coils 230, 232 are energized in an opposing exceeding manner which results in permanent magnetic flux components 236 and 237 traveling as shown and excess magnetic flux component 238 traveling as shown. Thus, in device 220 energizing the coils in an opposing exceeding manner results in magnetic coupling force on armature 234, albeit smaller than that in the aiding exceeding case.

Figure 11F:
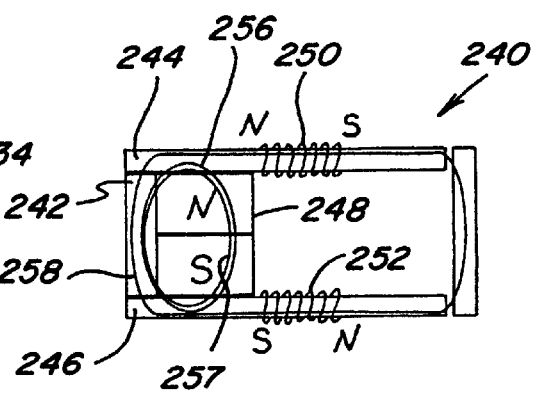

In device 240 of FIGS. 11D–11F a bypass 242 is provided between pole piece 244 and pole piece 246 but is located on an opposite side of permanent magnet 248 as compared to control coils 250, 252 and armature 254. Permanent magnet flux components 256 and 257 are shown for no coil energization in FIG. 11D. In FIG. 11E the paths of permanent magnet flux components 256 and 257, as well as excess coil magnetic flux 258, are shown when coils 250, 252 are energized in an aiding exceeding manner. In FIG. 11F the path of each magnetic flux component 256, 257, and 258 is shown when coils 230, 232 are energized in an opposed exceeding manner.

Figure 12:
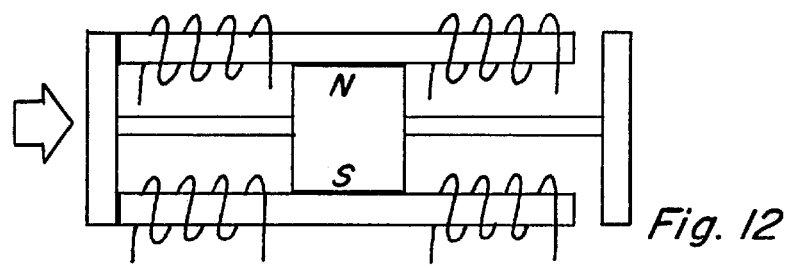
FIGS. 12, 12A–12E are side views of a two path permanent magnet device including two bypasses.
Figure 10:
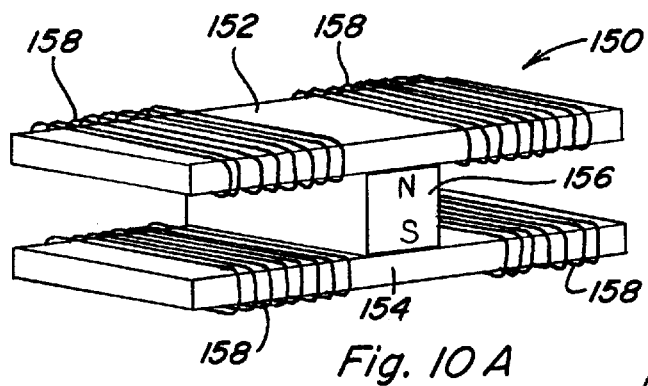
Figure 10:
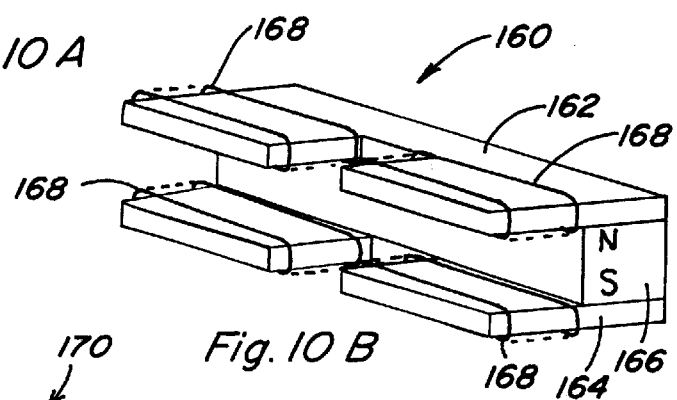
Figure 10:
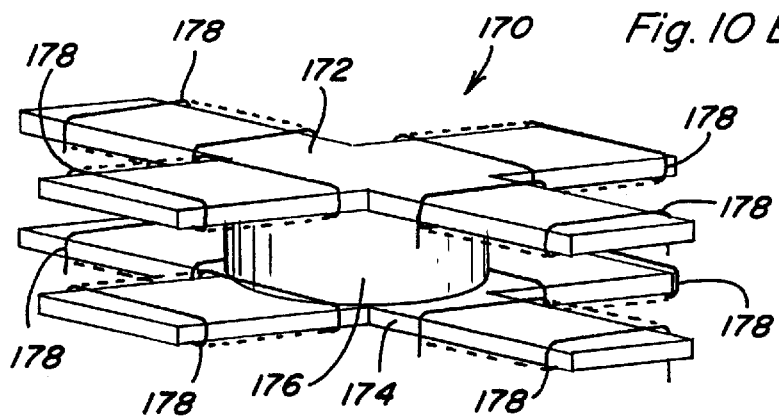
Figure 10:
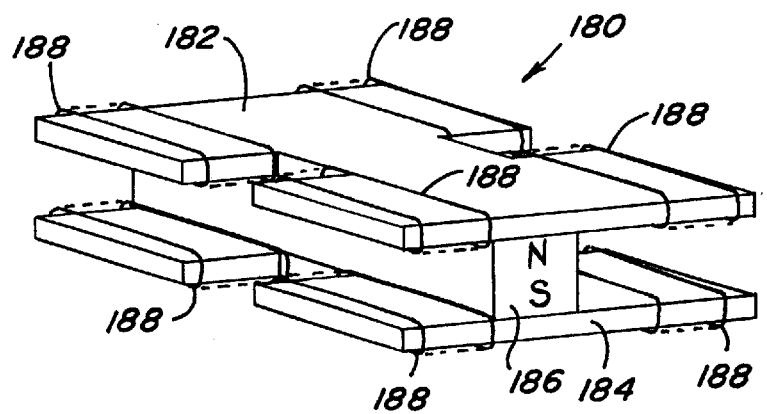
Figure 10:
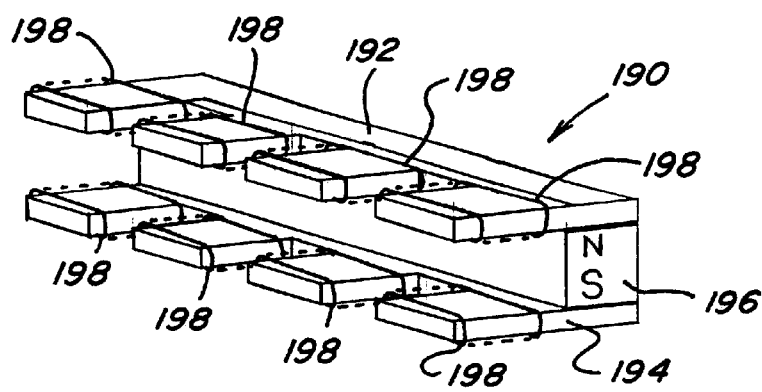
Figure 10:
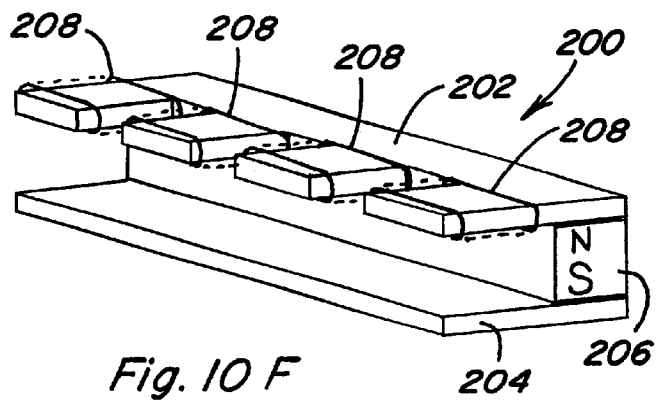
Figure 10:
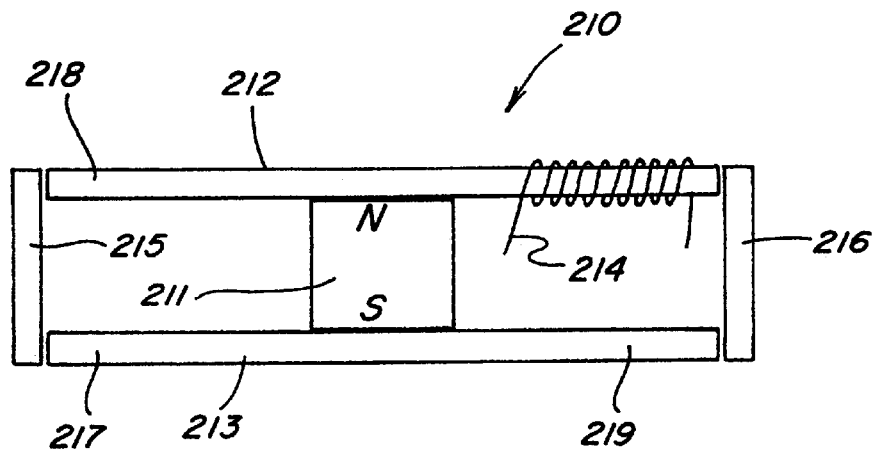
Figure 10:
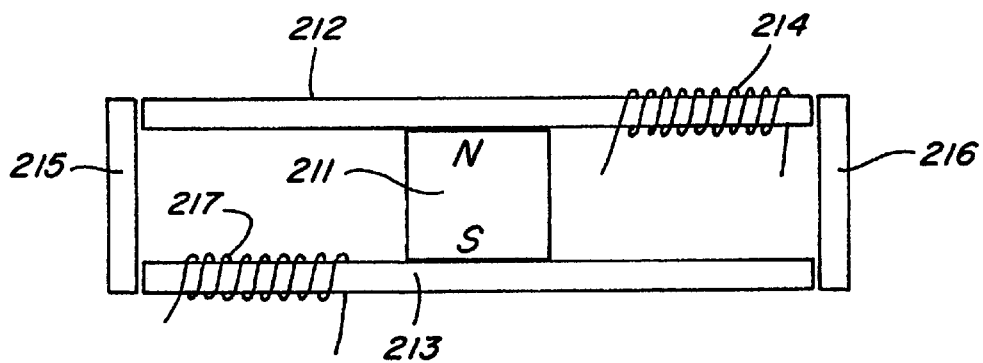
Figure 12A:
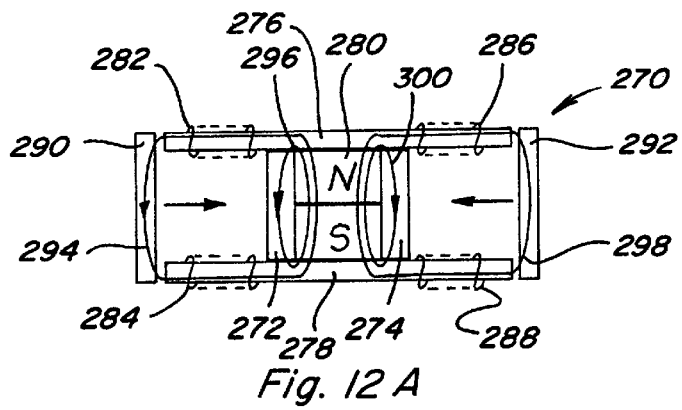
Figure 12B:
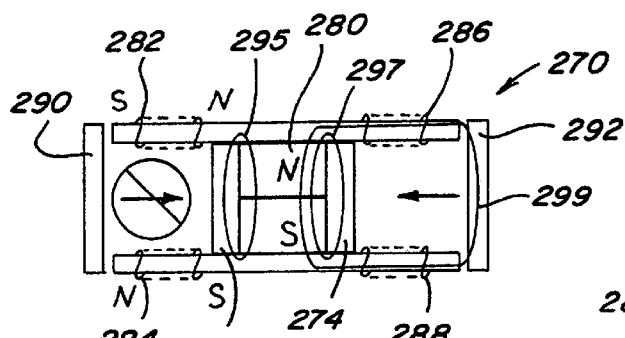

FIGS. 12A–12E depict a device 270 similar to that shown in FIGS. 7–9 except that bypasses 272 and 274 are provided from pole piece 276 to pole piece 278. Bypass 272 is located between permanent magnet 280 and control coils 282, 284 and bypass 274 is located between permanent magnet 280 and control coils 286, 288. Armatures 290 and 292 are also provided. When no coils are energized permanent magnet magnetic flux components 294, 296, 298, and 300 travel as shown in FIG. 12A.

If coils 282, 284 are energized in an opposing manner permanent magnet flux components 295, 297, and 299 travel as shown, with no flux component traversing the path which includes armature 290 and therefore no magnetic coupling force acting thereon. This would be the case for when coils 282, 284 are energized to the level where the coils magnetic flux just blocks, but does not exceed, the magnetic flux component 294 (FIG. 12A) from permanent magnet 280. If, however, coils 282, 284 are energized in an opposed exceeding manner an excess coil magnetic flux component 301 is produced which travels a path including armature 290 and bypass 272 results as shown in FIG. 12C.

Figure 12D:
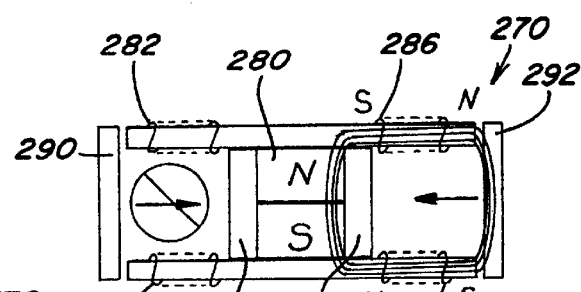
Figure 12C:
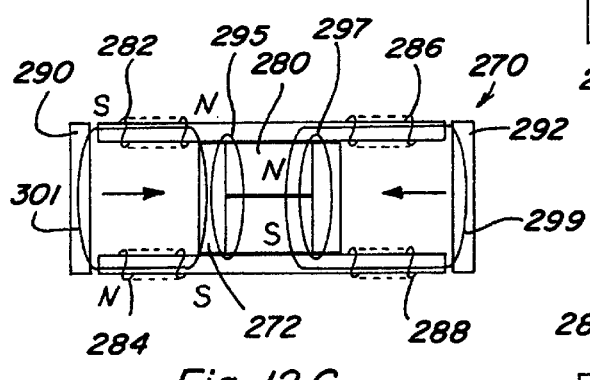
Figure 12E:
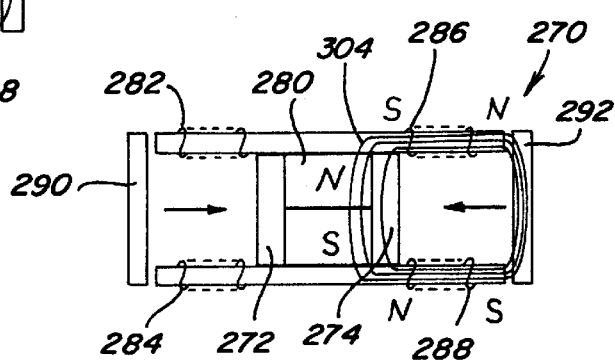

Coils 286, 288 may be energized in an aiding manner such that all permanent magnet magnetic flux travels along the path which includes armature 292 as shown in FIG. 12D. If coils 286, 288 are energized in excess of the level of FIG. 12D then the excess magnetic flux component 304 traverses the path which includes armature 292 and bypass 274 as shown in FIG. 12E, thereby increasing the magnetic coupling force on armature 292 as compared to FIG. 12D. The advantage of incorporating such bypasses into permanent magnet control components in certain applications will become apparent below.

Reciprocating Motion

Figure 13:
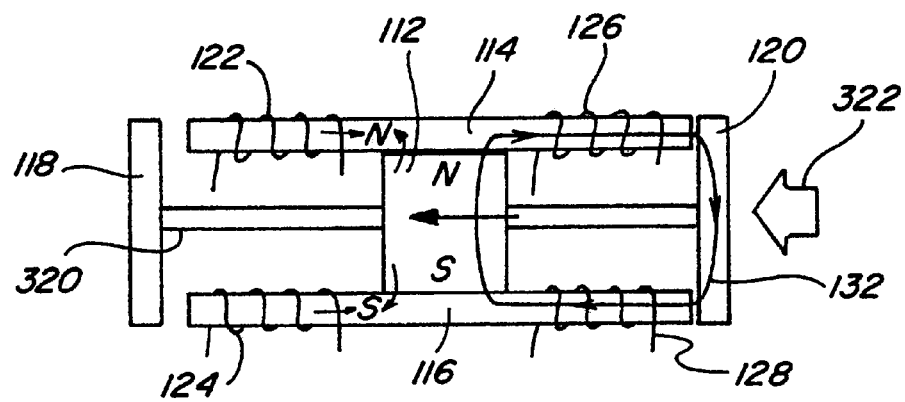
FIGS. 13A–13C are side views of a permanent magnet linear reciprocating device.
Figure 13:
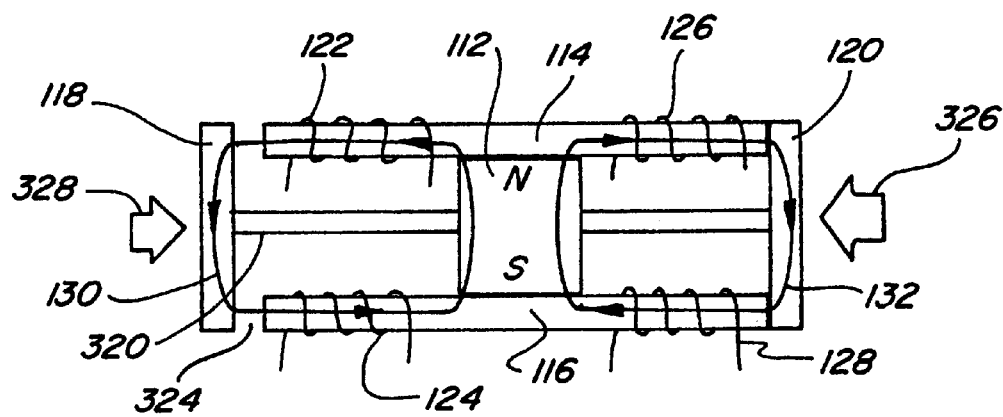
Figure 13:
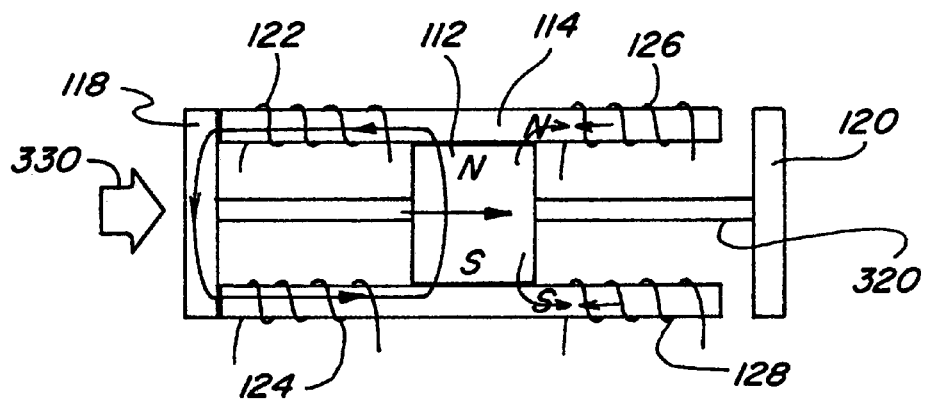

As mentioned above, controlling the path of magnetic flux from a permanent magnet can be useful in a variety of applications such as achieving reciprocating motion. In this regard, if the device 110 of FIGS. 7–9 is modified such that armatures 118 and 120 are fixed to a sliding shaft 320 as shown in FIGS. 13A–13C, and if the distance between the armatures is greater than the end to end length of pole pieces 114, 116, limited linear motion in two directions (left and right in FIGS. 13A–13C), and therefore linear reciprocating motion, can be achieved by the timed, alternate delivery of electrical signals to control coils 122, 124 and control coils 126, 128. By way of example, FIG. 13A represents the position of shaft connected armatures 118, 120 when coils 122, 124 are energized in an opposing manner to block the flux of permanent magnet 112 such that all magnetic flux traverses path 132 as shown and such that the resulting magnetic coupling force acts to the left as indicated by arrow 322. As shown in FIG. 13B when coils 122, 124 are de-energized the magnetic flux from permanent magnet 112 can again travel along path 130 through armature 118. However, due to the air gap 324 between armature 118 and pole pieces 114, 116 the reluctance along path 130 will be significantly greater than the reluctance along path 132. Accordingly, the amount of magnetic flux which flows along path 130 will be less than the amount of magnetic flux which flows along path 132 such that the magnetic coupling force on armature 118 acting to the right will be significantly less than the magnetic coupling force on armature 120 acting to the left as shown by arrows 326 and 328, which arrows are sized to represent the strength of the respective directional force. FIG. 13C represents the position of shaft connected armatures 118, 120 after coils 126, 128 are energized in a manner to oppose the flux of permanent magnet 112 such that all flux traverses path 130 and the resulting magnetic coupling force on armature 118, depicted by arrow 330, moves the shaft 10 connected armatures 118, 120 to the right.

Control coils 122, 124 and 126, 128 could also be energized in a flux aiding manner to achieve the same result. In such a device, FIG. 13A would represent coils 126, 128 energized to aid magnetic flux along path 132, FIG. 13B would again represent no coils energized, and FIG. 13C would represent coils 122, 124 energized to aid magnetic flux along path 130.

Figure 14:
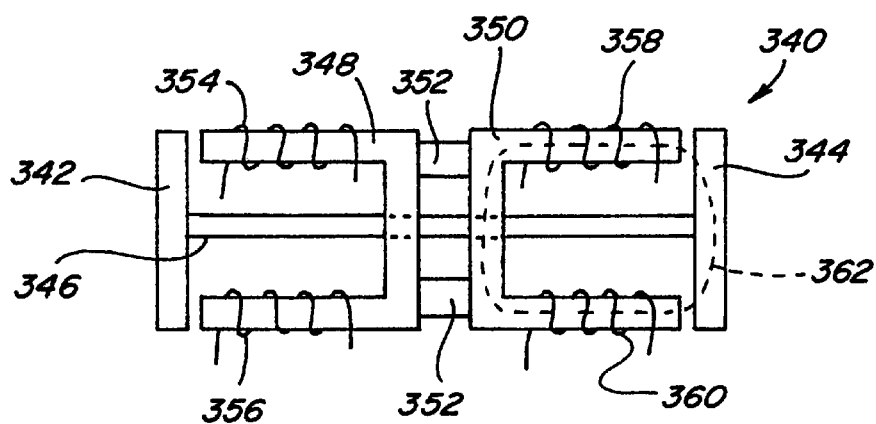
FIG. 14 is a side view of an electromagnetic linear reciprocating device.

Thus, by alternatingly energizing and de-energizing control coils 122, 124 and 126, 128 a linear reciprocating motion of shaft connected armatures 118, 120 may be achieved. Further, such reciprocating motion may be achieved by energizing the coils in either an opposing or aiding manner. The magnetic coupling force exerted on a given armature when 20 the control coils are energized to establish all magnetic flux along a single path which includes that armature is significantly greater than the magnetic coupling force which would be exerted on such armature by an identical energization of the control coils in the absence of the permanent magnet. This is demonstrated with reference to FIG. 14 which depicts a reciprocating device 340 in which only coils or electromagnets are utilized. As shown armatures 342 and 344 are connected by shaft 346, and each armature 342, 344 includes a respective U-shaped pole path piece 348, 350 which pole path pieces are mechanically connected by a non-magnetic material 352. Each pole path piece 348 and 350 has respective control coils 354, 356 and 358, 360 positioned therealong. By comparison with the device of FIGS. 13A–13C, if coils 358, 360 of device 340 are energized to cause magnetic flux flow in either direction, clockwise or counterclockwise, along path 362, the amount of electrical energy which would be required in order to achieve the same magnetic coupling force on armature 344 as achieved on armature 120 above in FIG. 13A would be twice that delivered to coils 122, 124 or 126, 128 in FIG. 13A. It is therefore demonstrated that by controlling or switching the flow of magnetic flux from a permanent magnet between at least two different paths results in greater coupling forces per unit of input electrical energy, and therefore that such control or switching will enable more work to be achieved per unit of input electrical energy.

Figure 15:
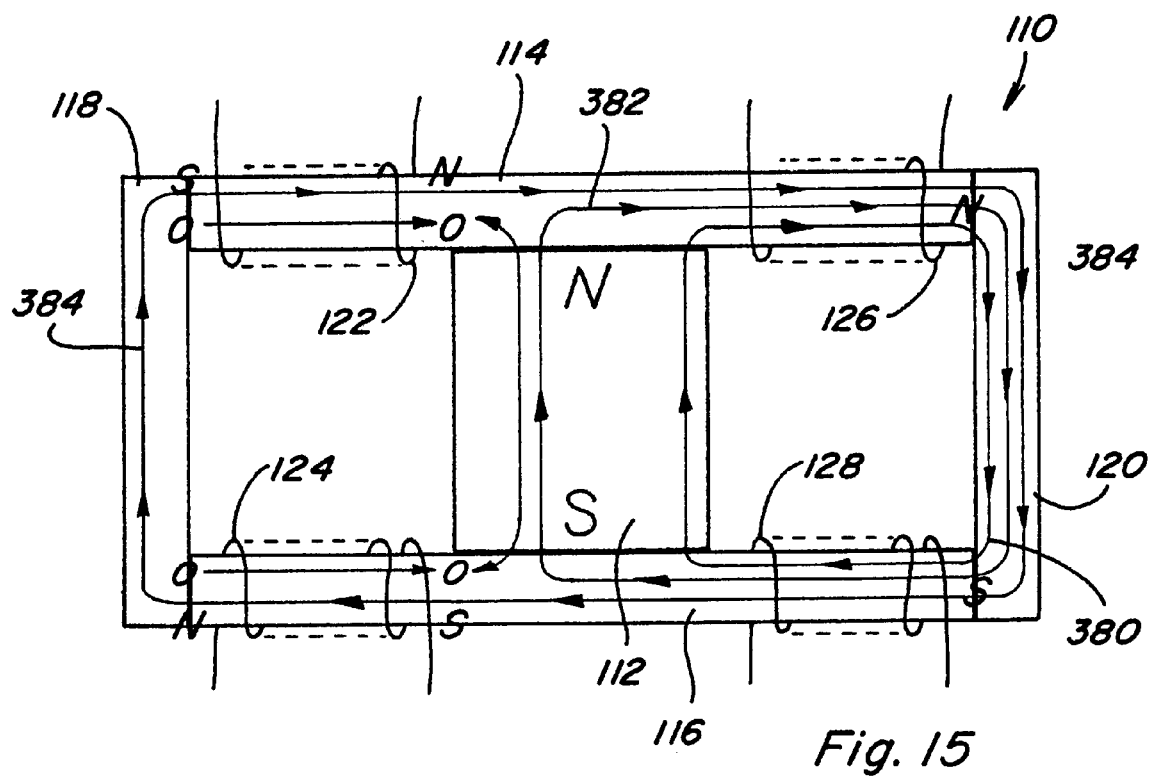
FIG. 15 is a side view of a two path permanent magnet device showing control coils energized in an exceeding manner.

As described above, if a coil is energized beyond the point where the magnetic flux produced by the coil aiding the amount of the permanent magnet's flux that is either opposed or aided, the extra magnetic flux needs a low reluctance path between the poles of the coil that produces the excess magnetic flux. If a complete low reluctance path is not provided for the excess magnetic flux there is little potential for taking advantage of the excess magnetic flux in terms of producing additional magnetic coupling forces. The path for such excess flux cannot be through a permanent magnet member. In assemblies which include an armature on each path, the armature will provide the necessary low reluctance path. Referring to FIG. 15, various components of the magnetic flux in device 110 (FIGS. 7–9) are depicted by numerals 380, 382, and 384 for the case when coils 122, 124 are energized to oppose the magnetic flux of permanent magnet 112 in an amount which exceeds the level of magnetic flux which permanent magnet 112 would cause to flow through armature 118 when no coils are energized. FIG. 15 is likewise representative of the case when coils 126, 128 are energized to aid the magnetic flux of permanent magnet 112 in an amount which exceeds the level of magnetic flux which permanent magnet 112 would cause to flow through armature 118 when no coils are energized. In particular, magnetic flux component 380 represents the magnetic flux of permanent magnet 112 which normally flows through the path including armature 120; magnetic flux component 382 represents the magnetic flux of permanent magnet 112 which is diverted by the opposing field of coils 122, 124 so as to traverse the path which includes armature 120; and magnetic flux component 384 represents the magnetic flux produced by coils 122, 124 which is in excess of the diverted magnetic flux 382. As shown, the excess magnetic flux 384 produced by coils 122, 124 traverses the path which includes armature 120 and bypasses permanent magnet 112 so as to also traverse the path which includes armature 118. Thus, the excess magnetic flux produced by coils 122, 124 adds to the permanent magnet flux traversing the path which includes armature 120, thus increasing the magnetic coupling force on armature 120, while at the same time providing a magnetic coupling force on armature 118.

Figure 16A:
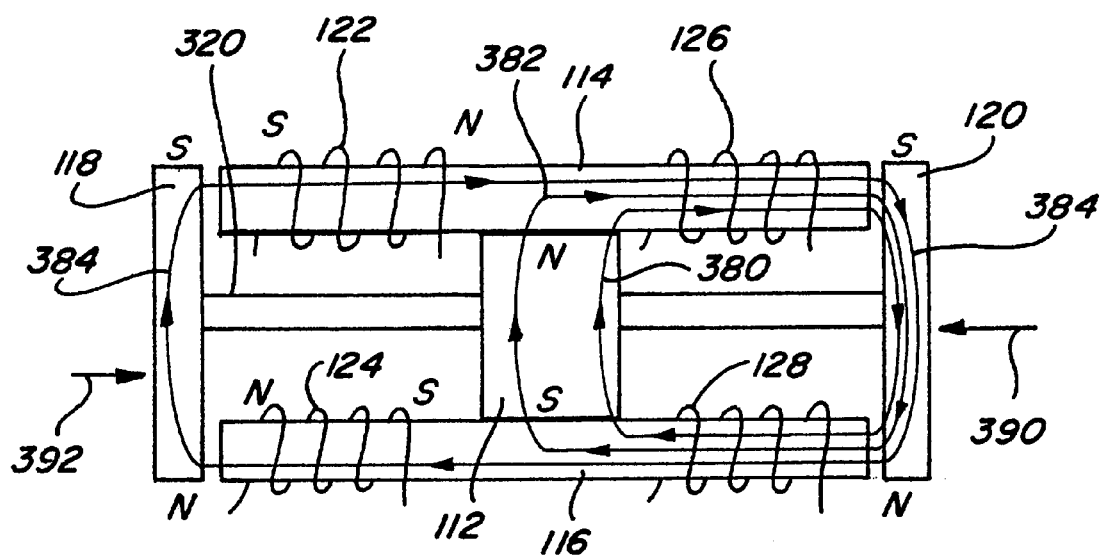
Figure 16:
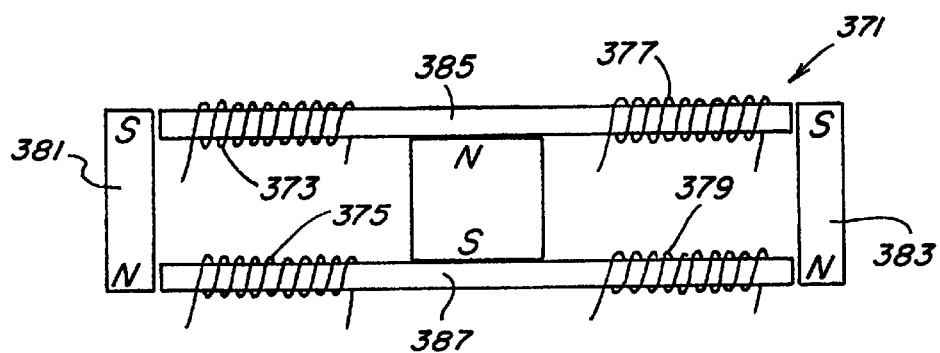
Figure 16:
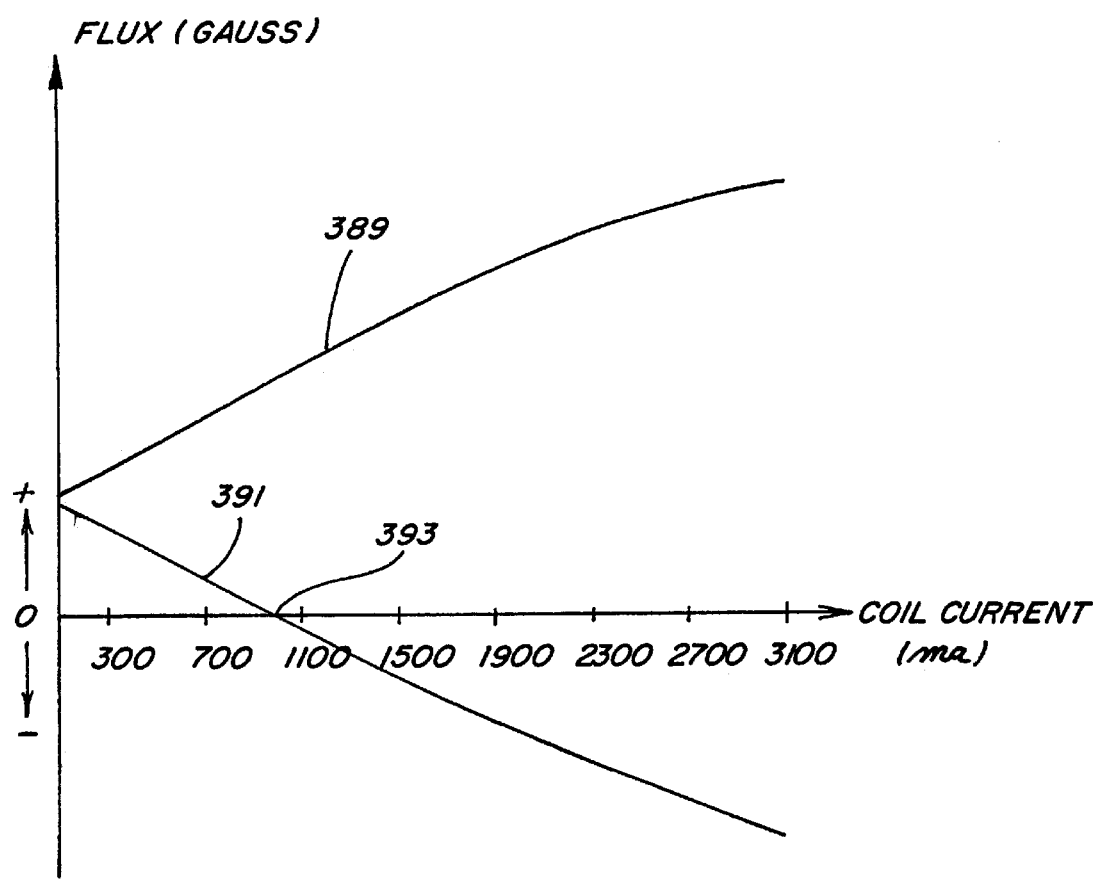
Figure 16D:
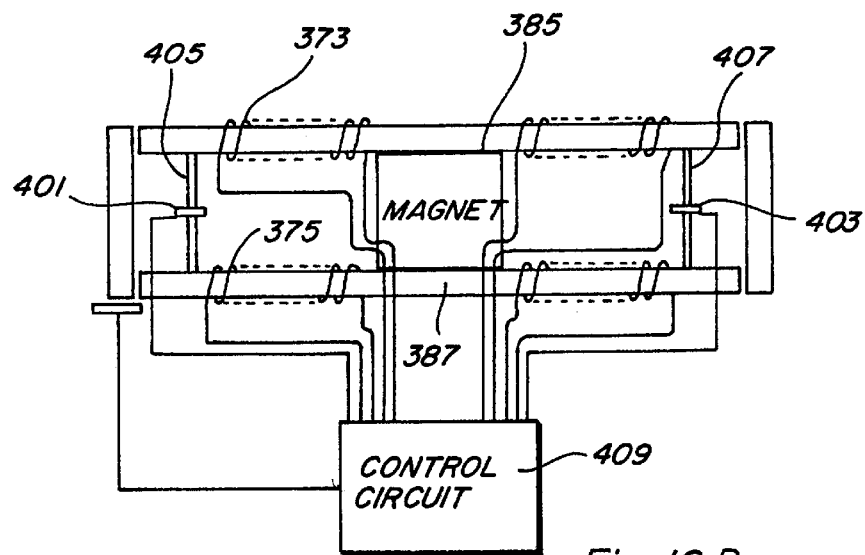
Figure 16E:
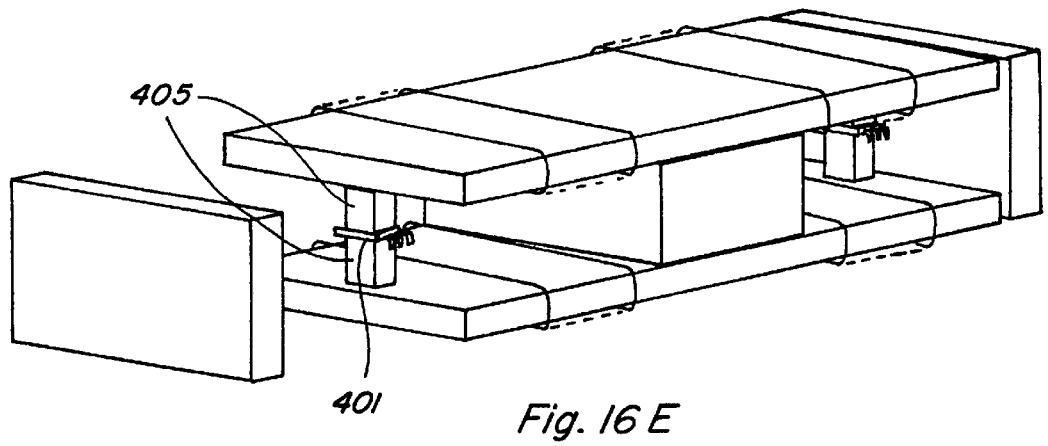

In a reciprocating device where armatures 118 and 120 are connected by shaft 320 as shown in FIGS. 13A–13C and again in FIG. 16, excess magnetic flux 384 will increase magnetic coupling force 390 on armature 120 acting to the left. However, because such excess flux 384 also traverses the path which includes armature 118, such excess magnetic flux 384 also results in a magnetic coupling force 392 on armature 118 which acts to the right. Even though excess magnetic flux 384 traversing the path which includes an armature 118 has an opposite polarity to that which would traverse the path due to permanent magnet 112, the magnetic coupling force on armature 118 still acts to the right because armature 118 is not polarity sensitive, that is, armature 118 will be attracted regardless of the direction of the magnetic flux traversing the path. The overall effect is that a resultant force which is the difference between force 390 and force 392 will act on the shaft-connected armatures 118, 120. However, if armatures 118 and 120 were formed by permanent magnets having polarities as shown at the top and bottom of such armatures, the force acting on each armature would be in the same direction and therefore additive.

In this regard reference is made to FIG. 16B in which a two path device 371 having four control coils 373, 375, 377 and 379 is shown with the illustrated armatures being formed by permanent magnets 381 and 383 having polarities as shown. With no coils energized both permanent magnet armatures 381 and 383 are attracted to the ends of pole pieces 385 and 387. With coils 373 375 energized in an opposing manner and coils 377, 379 energized in an aiding manner, the attractive force on permanent magnet armature 383 will generally increase and the attractive force on permanent magnet armature 381 will generally decrease. This is demonstrated with reference to the graph of FIG. 16C which depicts a graph of the current flowing in the control coils on the x-axis verses the magnetic flux in gauss on the y-axis with line 389 representing the flux along the aiding side of device 371 and line 391 representing the flux along the opposing side of device 371. As shown the magnetic flux on the coil opposing side decreases as the coil current increases and passed through zero at point 393. After point 393 reverse magnetic flux begins to be produced and would result in a repelling force on permanent magnet armature 381. In some applications particularly those where permanent magnet armatures and rotors are not utilized, it will be critical to recognize point 393 so that reverse magnetic flux is not produced. In this regard reference is made to FIGS. 16D and 16E in which use of Hall Effect switches 401 and 403 is incorporated to enable controlling the coil energizing current in situations where it is desirable to prevent reverse magnetic flux. As shown small bypasses 405 and 407 are provided with Hall Effect switches 401 and 403 disposed in gaps therealong, the switches being connected to control circuit 409. As the flux traveling along the bypass path falls to zero the Hall Effect switch can be utilized to prevent further energization of the control coils so that no reverse flux is created.

Figure 17A:
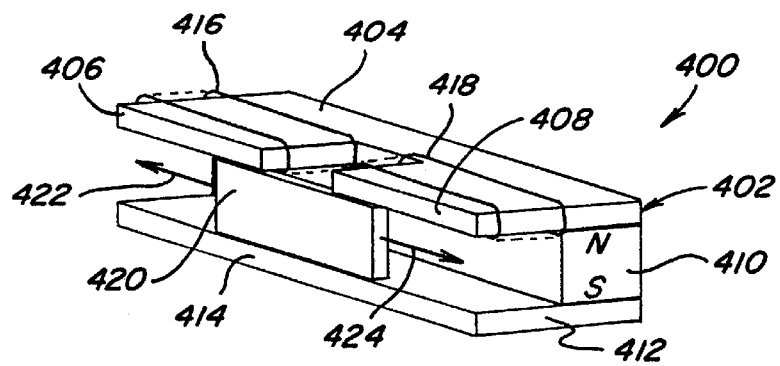
Figure 17B:
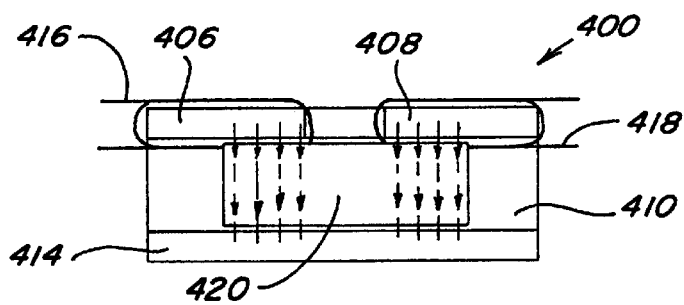
Figure 17C:
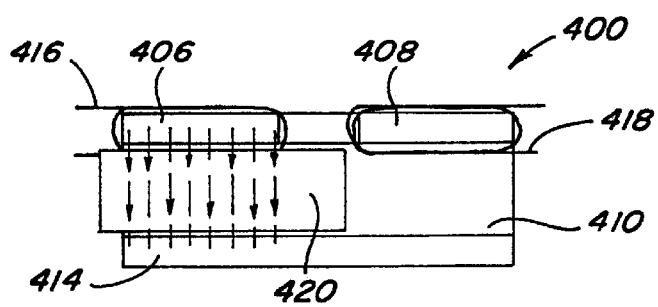

Another embodiment of a device 400 which would provide reciprocating motion is shown in FIGS. 17A–17D in which a permanent magnet control component 402 having two flux paths may is provided. A first pole piece 404 has two spaced, adjacent path portions 406 and 408 extending beyond the perimeter of the pole face of permanent magnet 410, and a second pole piece 412 includes only one continuous portion 414 extending beyond the perimeter of the pole face of permanent magnet 410, each path portion 406 and 408 of pole piece 404 being substantially aligned with at least a part of portion 414 of pole piece 412. Control coil 416 is positioned along pole piece path portion 406 and control coil 418 is positioned along pole piece portion 408. An armature 420 is positioned in the region between pole piece path portions 404, 406 and pole piece portion 414 and is free to slide from side to side as shown by arrows 422 and 424. A front view of component device 400 with no coils energized and armature 420 at a mid-point depicts flux flowing from the north pole face of permanent magnet 410, through each of pole piece path portions 406 and 408, through armature 420, and returning to the south pole face through pole piece portion 414. Thus, the magnetic flux divides equally along two paths. If coil 416 is energized in an aiding manner, or if coil 418 is energized in an opposing manner, all or a majority of the permanent magnets'magnetic flux can be made to flow through pole piece portion 406 such that a resulting magnetic coupling force on armature 420 causes it to move to the left as shown in FIG. 17C.

Figure 17D:
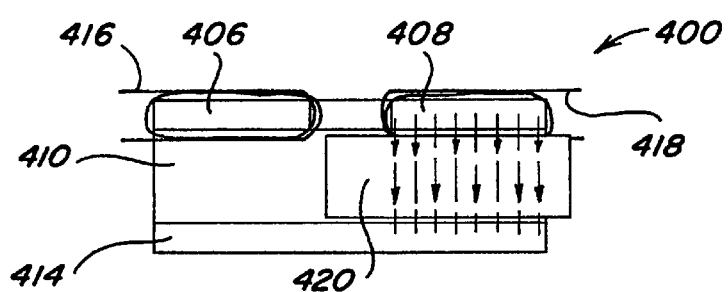

Likewise, if control coil 416 is energized in an opposing manner, or if control coil 418 is energized in an aiding manner, all or a majority of the permanent magnet flux can be made to flow through pole piece path portion 408 such that a resulting magnetic coupling force on armature 420 causes it to move to the right as shown in FIG. 17D. Accordingly, by alternately energizing and de-energizing coils 416 and 418 a reciprocating motion of armature 420 may be achieved.

Linear Motion

Figure 18A:
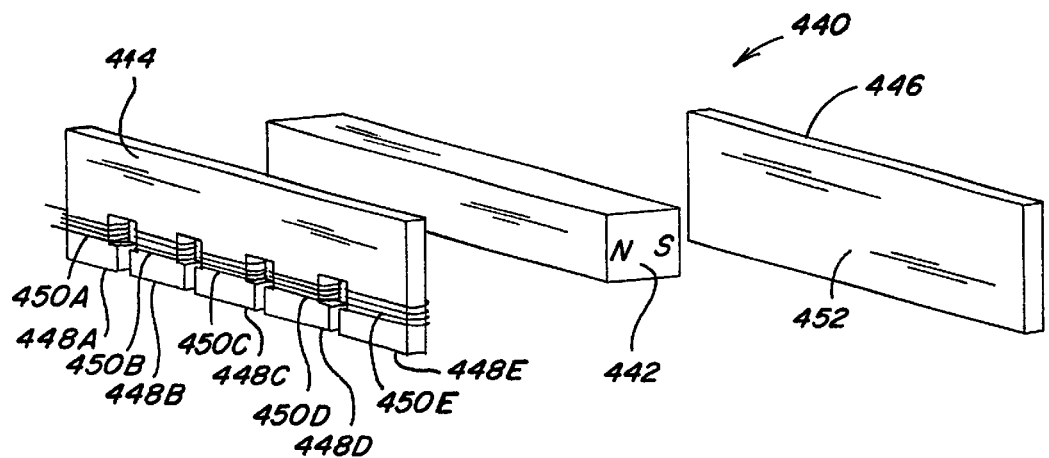
Figure 18B:
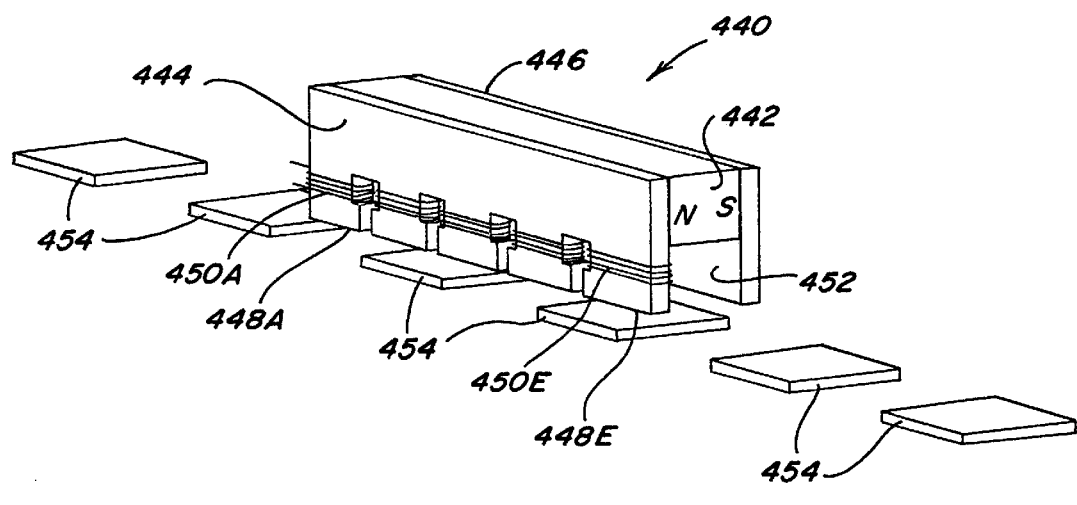
Figure 18C:
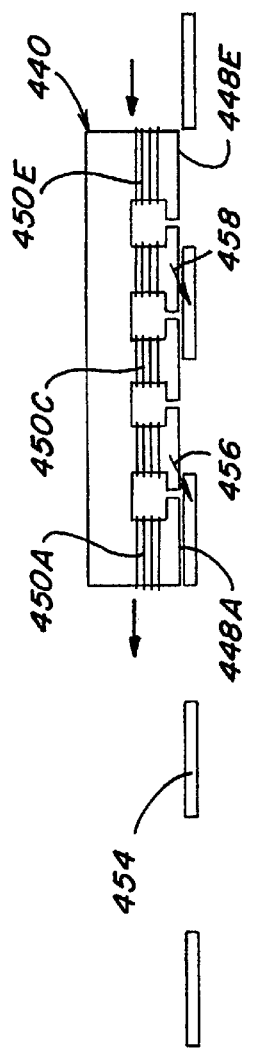
Figure 18D:
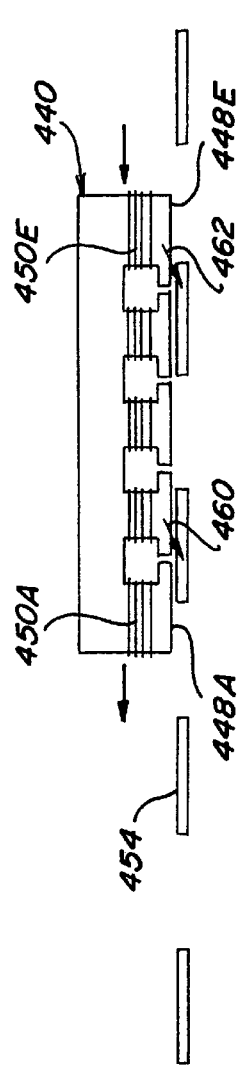
Figure 18E:
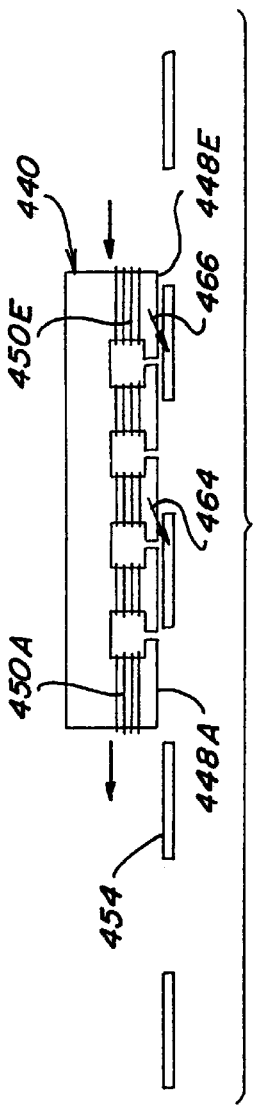

Referring now to FIGS. 18A–18E, linear motion in accordance with the present invention is described. In particular, a permanent magnet control component 440 including a permanent magnet 442 with a pole piece 444 positioned against the north pole face thereof and a pole piece 446 positioned against the south pole face thereof is shown in an exploded view in FIG. 18A and assembled in FIG. 18B. Pole piece 444 includes five path portions 448A–448E which extend beyond the perimeter of the north pole face of permanent magnet 442 to one side thereof and at respective positions along the length thereof, each path portion 448A–448E including a respective control coil 450A–450E positioned therearound. Pole piece 446 includes one portion 452 extending beyond the perimeter of the south pole face of permanent magnet 442 to the one side thereof, which portion 452 extends along the entire length of permanent magnet 442. A plurality of armatures 454 define a path of relative movement between permanent magnet control component 440 and such armatures 454, and by providing timed energization of given control coils 450A–450E such relative movement can be achieved. The sequence of side views depicted in FIGS. 18C–18E illustrate such relative movement, with coils 450A, 450C and 450E being energized in an opposing manner simultaneously in FIG. 18C, with coils 450A and 450D being energized simultaneously in an opposing manner in FIG. 18D, and with coils 450B and 450D being energized simultaneously in an opposing manner in FIG. 18E. In FIG. 18C, magnetic flux will only flow along path portions 448B and 448C of pole piece 444 causing resultant magnetic coupling forces depicted by arrows 456, 458 which act to move permanent magnet control component 440 to the left, assuming armatures 454 are fixed. Similarly, due to the timing of subsequent coil energization resultant magnetic forces depicted by arrows 460, 462 in FIG. 18D and arrows 464, 466 in FIG. 18E act to continue movement of permanent magnet control component 440 to the left. Thus, if permanent magnet control component 440 were fixed to a device or structure, controlled movement of the device or structure along the path defined by armatures 454 could be achieved. Conversely, if permanent magnet control component 440 were fixed and armatures 454 were located on a device or structure, controlled movement of the device or structure could also be achieved. It is also easily recognized that by varying the coil energization sequence and timing relative movement in the opposite direction can be achieved. Further, if the permanent magnet was doughnut shaped and the armatures were arranged in a circumferential pattern, rotary motion would likewise be achievable.

Rotary Motion

One embodiment of a rotary motion device or motor 500 which incorporates various permanent magnet flux control aspects of the present invention is shown in the exploded view of FIG. 19 and in the partial assembled view of FIG. 20. Motor 500 includes a rotor assembly which includes a shaft 502 and associated upper bearing 504, a non-magnetic disk member 506 mounted for rotation with shaft 502, and a rotor pole piece 508 which is mounted for rotation with disk member 506 such as by the use of screws 510. Rotor pole piece 508 includes a ring-shaped portion having two inwardly extending magnetic flux path portions 512A and 512B. A stator assembly of motor 500 includes a doughnut or ring-shaped permanent magnet 514 having an upwardly directed north pole face positioned adjacent and in close proximity to rotor pole piece 508, and a downwardly directed south pole face positioned adjacent and in contact with a stator pole piece 516. Stator pole piece includes a ring-shaped portion having five inwardly projecting path portions 518A–518E. Each path portion includes a respective winding post 520A–520E extending therefrom and having a respective control coil 522A–522E wound thereon. Stator pole piece faces 524A–524E are positionable on respective winding posts 518A–518B and, as shown in the partial assembly of FIG. 20, are substantially aligned with the top surface of permanent magnet 514 so as to be positionable adjacent rotor path portions 512A and 512B when aligned therewith. Each of winding posts 518A–518E and stator pole piece faces are formed of magnetic material, and although shown as separate pieces, an integral, one piece stator could be formed with similar winding posts and pole piece faces machined thereon. Lower bearing 526 is also shown.

Figures 21C, 21D, 21E:
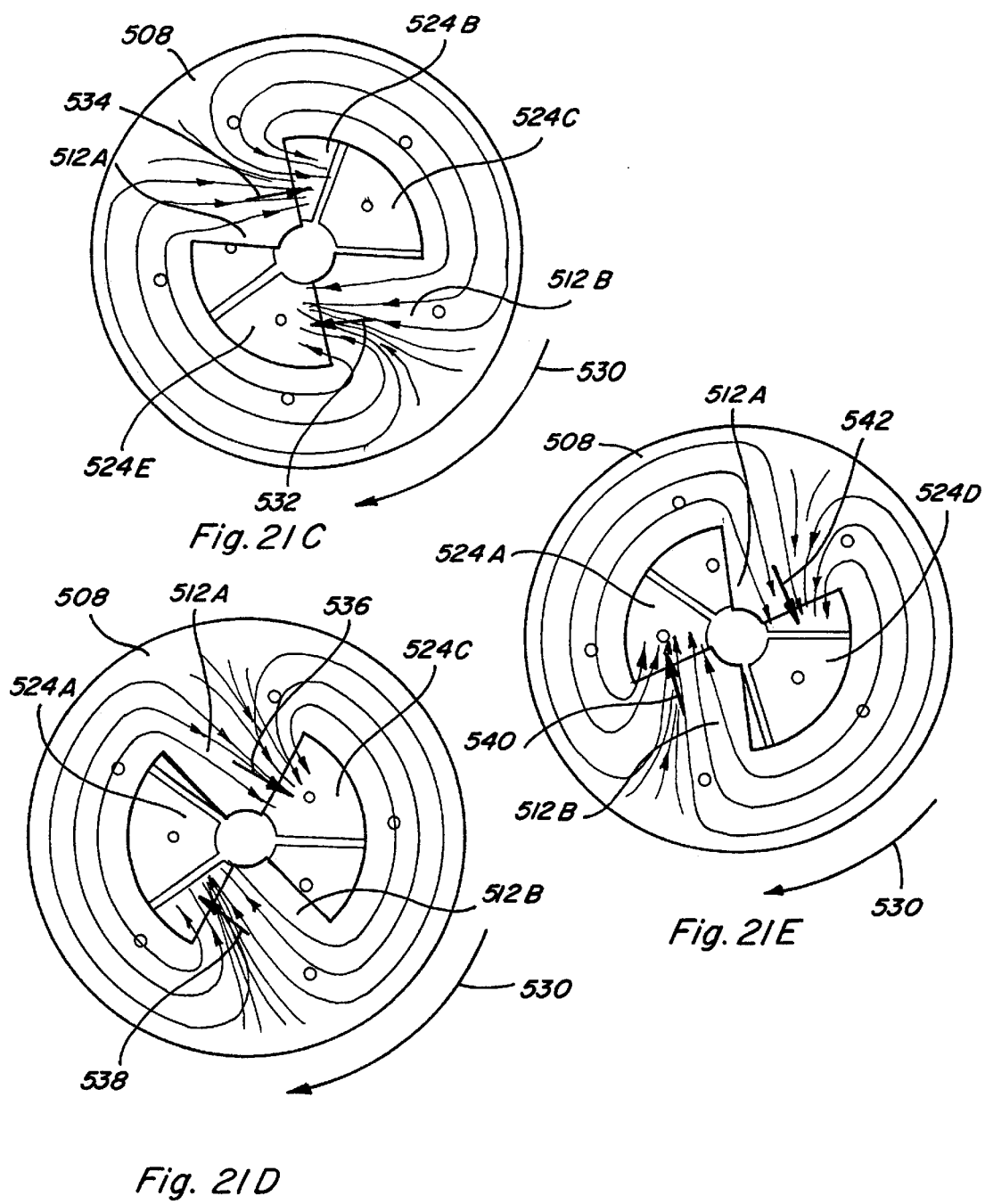

FIGS. 21A–21E illustrate top views of the partial assembly of FIG. 20 with magnetic flux shown. In FIG. 21A magnetic flux travel when none of coils 522A–522E are energized is depicted. Disregarding leakage flux, due to the low reluctance path provided by rotor pole piece path portions 512A and 512B, the majority of magnetic flux from the north pole face of permanent magnet 514 will travel radially inward along one of such path portions before passing downward through the stator assembly and returning to the south pole face of permanent magnet 514. It is noted that rotor pole piece 508 includes two path portions and stator pole piece 516 includes five path portions such that rotor pole piece path portions 512A and 512B will always be skewed relative to the stator pole piece faces 524A–524E. Only one rotor pole piece path portion can directly align with a stator pole piece face at a given time. By alternatingly energizing the control coils of each of the stator pole piece paths, rotary motion of the rotor may be achieved.

In particular, referring to FIGS. 21B–21D, an energizing sequence which results in such rotary motion is described. In FIG. 21B, control coils 522A and 522C are energized in a permanent magnet flux opposing manner. Permanent magnet magnetic flux traveling along rotor pole piece path portion 512A tends to traverse to stator pole piece face 524B causing a magnetic coupling force indicated by arrow 526. Likewise, permanent magnet flux traveling along rotor pole piece path portion 512B tends to traverse to stator pole piece face 524D causing a magnetic coupling force indicated by arrow 528. The result is rotation of rotor pole piece 508 in a clockwise direction as indicated by arrow 530.

Referring to FIG. 21C, just after rotor pole piece path portion 512B is no longer aligned with stator pole piece face 524D, control coil 522C is de-energized and control coil 522D is energized in an opposing manner such that the permanent magnet flux traveling along rotor pole piece path 512B tends to traverse to stator pole piece face 524E resulting in magnetic coupling force indicated by arrow 532. Control coil 522A remains energized such that a magnetic coupling force indicated by arrow 534 results. Accordingly, clockwise rotation of rotor pole piece 508 is continued.

In FIG. 21D, just after rotor pole piece path portion 512A is no longer aligned with stator pole piece face 524B, control coil 522A is de-energized and control coil 522B is energized in a permanent magnet magnetic flux opposing manner such that the permanent magnet magnetic flux traveling along rotor pole piece path 512A tends to traverse to stator pole piece face 524C such that a magnetic coupling force indicated by arrow 536 results. Control coil 522D remains energized such that a magnetic coupling force indicated by arrow 538 results, and clockwise rotation of rotor pole piece 508 is continued.

As shown in FIG. 21E, just after rotor pole piece path portion 512B is no longer aligned with stator pole piece face 524E, control coil 522D is de-energized and control coil 522E is energized in a permanent magnet magnetic flux opposing manner such that the permanent magnet magnetic flux traveling along rotor pole piece path 512B tends to traverse to stator pole piece face 524A such that a magnetic coupling force indicated by arrow 540 results. Control coil 522B remains energized such that a magnetic coupling force indicated by arrow 542 results, and clockwise rotation of rotor pole piece 508 is continued.

Thus, by alternating energizing and de-energizing control coils 522A–522E, in a predetermined timed sequence based upon rotation of the rotor assembly, continued rotation movement of rotor pole piece 508 may be achieved. Such an energization/de-energization scheme can be achieved utilizing circuitry common in the art, such as the control circuitry described in Applicant's U.S. Pat. Nos. 5,463,263 and 5,455,474, as well as various of the circuit configurations described herein below. Referring now to FIG. 22, an assembled view of rotary motor 500 is shown including a housing or cover formed by an upper housing member 544 and a lower housing member 546, with portions of each housing member cut away to expose motor structure described above. It is recognized that such housing members 544 and 546 should be formed of a non-magnetic material, and likewise that motor shaft 502 and bearings 504, 526 should be formed of a non-magnetic material.

In another embodiment, a rotary motion device or motor 580 in accordance with the present invention is shown in an exploded perspective view in FIG. 23 and in an assembled perspective view in FIG. 24. Two spaced permanent magnets 582 and 584 are positionable between stator pole pieces 586 and 588. Stator pole piece 586 includes two path portions 590A and 590B extending away from permanent magnets 582, 584 in opposite directions. Likewise, stator pole piece 588 includes two path portions 592A and 592B extending away from permanent magnets 582, 584 in opposite directions and alignable respectively with stator pole piece path portions 590A and 590B. Control coils 594, 596, 598, and 600 are each positioned along a respective stator pole piece path portion as shown. A non-magnetic shaft 602 includes a pair of like elongated rotor members 604 and 606, formed of magnetic material, mounted at spaced locations thereon and being angularly oriented with respect to each other, shaft 602 passing between spaced permanent magnets 582 and 584. Non-magnetic end cap members 608 and 610 are attachable to the ends of stator pole pieces 586 and 588 and are configured for receiving shaft 602 and respective bearings 612 and 614.

The ends of respective stator pole pieces 506 and 508 are configured for a given desired coupling relationship with rotor members 604 and 606. For example, as shown in the exemplary end views of FIGS. 25A and 25B, with end cap 608 removed, the end of stator pole piece 586 may include an arcuate portion 616 which is configured to create a variable reluctance air gap 618 with elongate rotor member 604. The end of stator pole piece 588 includes an arcuate portion 620 which is likewise configured to create a variable reluctance air gap 622 with rotor member 604. In particular, portion 618 includes a circumferential curvature which has a center point offset below the axis of rotation of shaft 602 and rotor member 604 as indicated by circle 624 shown in shadow. Similarly, portion 620 includes a circumferential radius of curvature which has a center point offset above the axis of rotation of shaft 602 and rotor member 604. When magnetic flux is passing along the path which includes a given end of the assembly, maximum coupling between the rotor member and stator pole pieces occurs when the rotor is positioned as shown in FIG. 25B. Accordingly, the illustrated rotor member and stator pole piece configurations in and of themselves do not provide any skewing to the direction of rotation of the rotor assembly.

In this regard, various configurations for the rotor and ends of the stator pole pieces are shown in the end views of FIGS. 26–28, which configurations provide skewing the direction of rotation. In particular, in device 620 of FIG. 26 a rotor member 622 having notches 624 and 626, which notches provide for greater magnetic coupling with the stator pole pieces 628 and 630 at corners 632 and 634 such that rotation is skewed in the clockwise direction. If notches were instead located at corners 632 and 634, skewed rotation in the counterclockwise direction would be the result. In device 620 such counterclockwise rotation could also be achieved by removing rotor 622 from shaft 636, flipping it end to end, and replacing it on shaft 636.

In the device 640 of FIG. 27, a portion 642 of the arcuate end portion of stator pole piece 644 is removed and a portion 646 of the arcuate end portion of stator pole piece 648 is removed. This configuration results in greater magnetic coupling between rotor member 650 and stator pole piece 644 at corner 652, and greater magnetic coupling between rotor member 650 and stator pole piece 648 at corner 654, such that rotation is skewed in the counterclockwise direction. Clockwise rotation could be achieved by instead modifying the opposite side of stator pole pieces 644 and 648.

FIG. 28 depicts an end view of a device 660 in which the axis 662 of the arcuate end portion of upper stator pole piece 664 and lower stator pole piece 666 is placed at an angle A as shown. This configuration creates an unequal variable reluctance air gap where opposite corners of rotor member 668 are closer to stator pole pieces 664 and 666. Further, the angle at which maximum magnetic coupling between rotor member 668 and stator pole pieces 664 and 666 occurs is retarded by angle A. Rotation would be in the counterclockwise direction for the illustrated configuration.

Figure 29A:
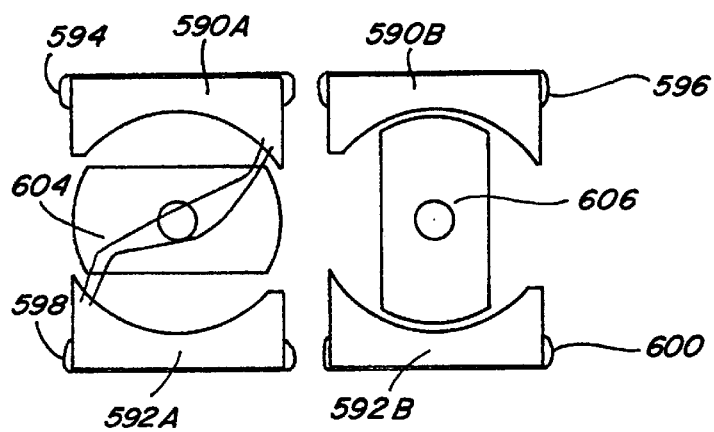
Figure 29B:
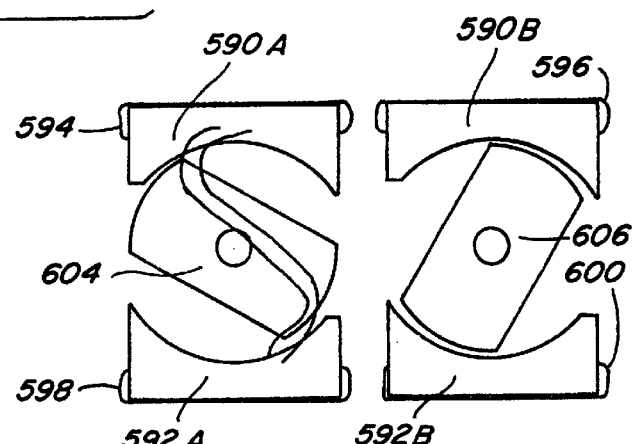
Figure 29C:
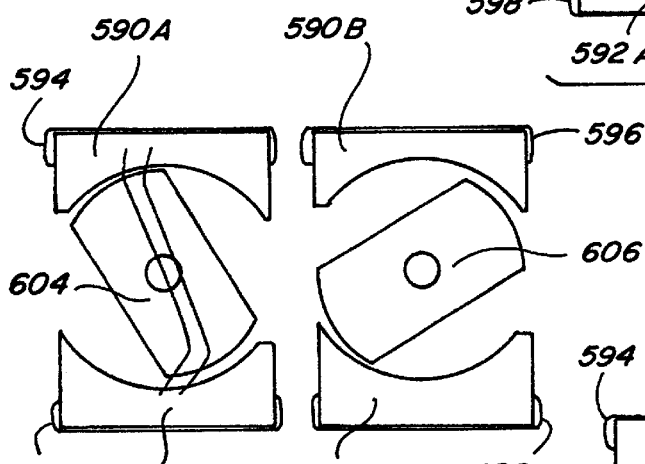
Figure 29D:
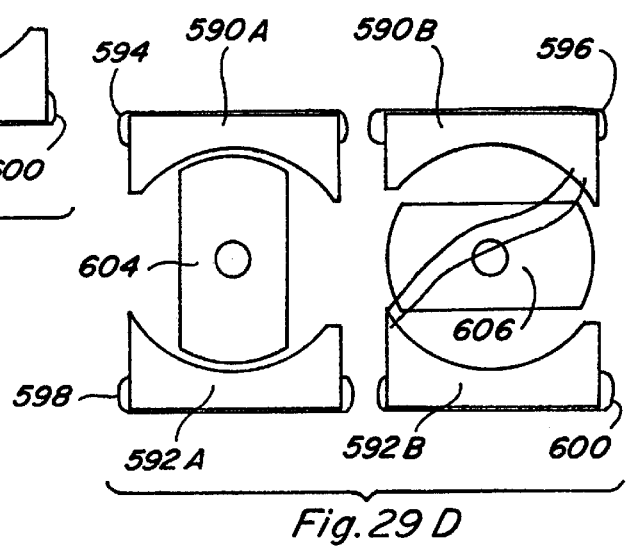

Referring again to motor 580 of FIGS. 23–25, rotary motion of such device is depicted in the end views of FIG. 29A–29D. In each end view the end cap has been removed to show rotation of the rotor members and in each of FIGS. 29A–29D an end view depicting rotor member 604 and an end view depicting rotor member 606 are shown side-by-side. In FIG. 29A, rotor member 604 is defined as being at zero degrees and rotor member 606 is defined as being at ninety degrees. Control coils 594, 598 are energized in a permanent magnet magnetic flux aiding manner such that no magnetic flux passes through stator pole piece path portions 590B and 592B. This allows rotor member 606 to move out of its ninety degree position and the magnetic coupling between rotor member 604 and stator pole piece path portions 590A and 592A will cause rotation to the position shown in FIG. 29B and then FIG. 29C. When rotor member 604 reaches the ninety degree position shown in FIG. 29D control coils 594, 598 are de-energized and control coils 596, 600 are energized in a permanent magnet magnetic flux aiding manner causing rotation to continue due to the magnetic coupling between rotor member 606 and stator pole piece path portions 590B and 592B. Thus, by alternatingly energizing the control coils of each path with every ninety degree rotation of rotor members 604 and 606, continuous rotary motion is achieved.

The initial direction of rotation can be controlled by the circuit means used to energize control coils 594, 598 and 596, 600, which circuit means includes circuitry for detecting the angular position of the rotor members. In particular, if rotor members 604 and 606 are at rest in the position shown in FIG. 29A, and coils 594, 598 are energized in an aiding manner, rotation may be clockwise or counterclockwise. If the desired direction is clockwise but upon energization of coils 594, 598 the rotor members begin to move counterclockwise, the detection circuitry will immediately de-energize coils 594, 598 and energize coils 596, 600 so that the counterclockwise direction is achieved.

Further, bypasses around permanent magnets 582 and 584 could be provided in rotary motion device 580, such as those shown in FIG. 12, and rotor members 604 and 606 could be formed by permanent magnets so as to take advantage of energizing the control coils in an exceeding manner.

A third embodiment of a rotary motion device or motor 650 is shown in the exploded partial perspective view of FIG. 30 and in the assembled partial perspective view of FIG. 31. In motor 650 the stator assembly includes a control component 651 including a permanent magnet 652 having a stator pole piece 654 positioned adjacent one pole face thereof and a stator pole piece 656 positioned adjacent the opposite pole face thereof. Stator pole piece 654 includes a path portion 658A extending to one side of permanent magnet 652 and a path portion 658B extending to the one side thereof and spaced from first path portion 658A. Control coils 660 and 662 are positioned along respective stator pole piece path portions 658A and 658B. Likewise, stator pole piece 656 includes path portions 664A and 664B which extend in a similar manner therefrom so as to be aligned with stator path portions 658A and 658B respectively. Control coils 666 and 668 are positioned along respective stator pole piece path portions 664A and 664B. Positioned opposite and facing control component 651 is a like control component 670 including permanent magnet 672, stator pole piece 674 with path portions 676A and 676B having respective control coils 678 and 680, and stator pole piece 682 with path portions 684A and 684B having respective control coils 686 and 688. The end of each of the pole piece path portions 658A, 658B, 664A, 664B, 676A, 676B, 684A, and 684B is of a generally arcuate configuration.

A rotor assembly of motor 650 includes a non-magnetic shaft 700 having a permanent magnet rotor member 702 mounted thereon for rotation therewith. Permanent magnet rotor member 702 is generally ring-shaped and segmented to include distinct north and south pole faces which reverse about every ninety degrees therearound. When assembled the top and bottom surfaces of permanent magnet rotor member 702 align with pole pieces 654, 656, 674, and 682 of the stator assembly and are preferably configured such that a minimal gap between the outer surface of permanent magnet rotor member 702 and the arcuate surfaces of the pole piece path portions is provided.

Figures 32A, 32B, 32C, 32D:
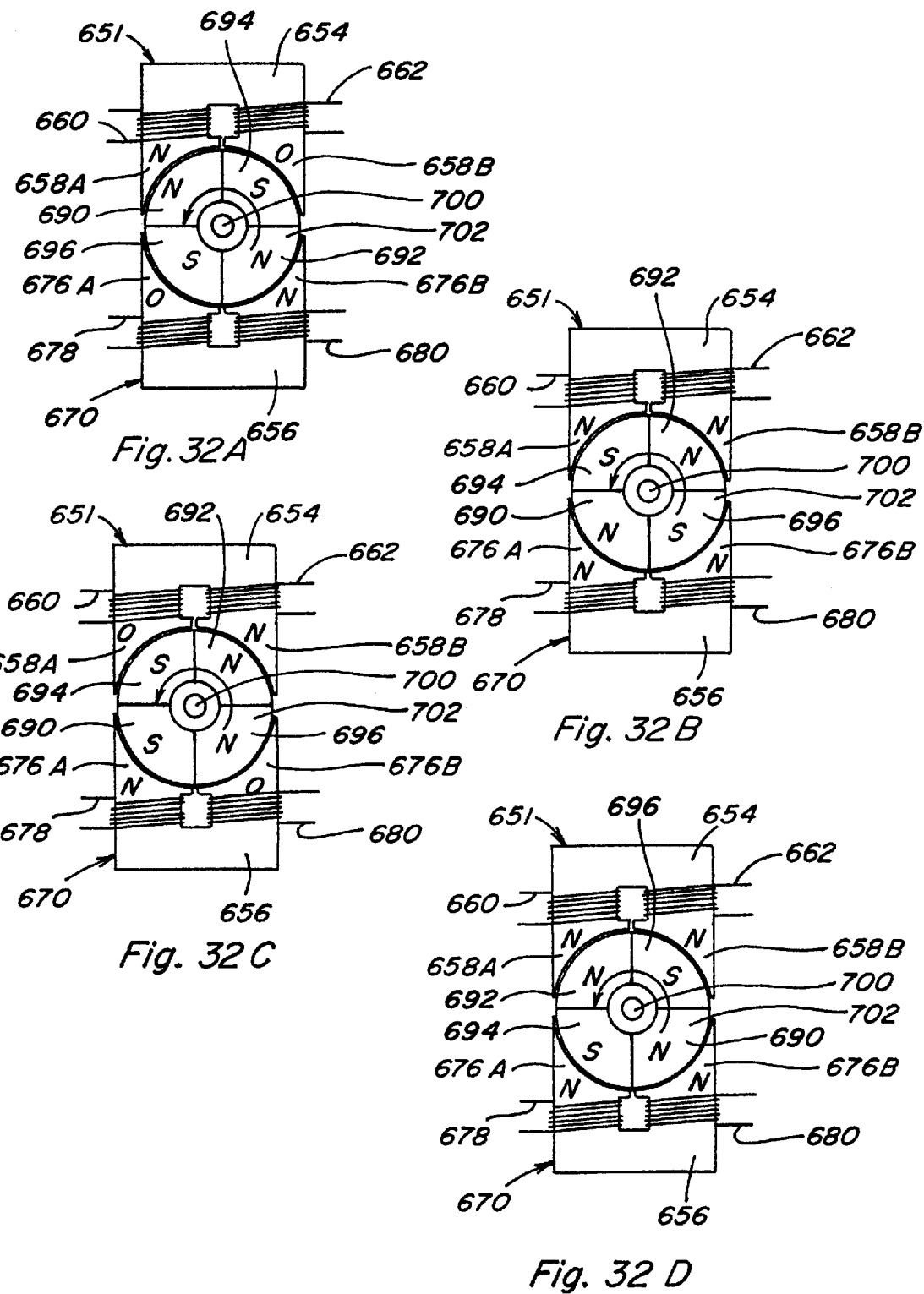

Rotation of device 650 can be achieved by controlled, timed energizing and de-energizing of control coils 660, 662, 666, 668, 678, 680, 686, and 688. Exemplary rotation is demonstrated with reference to the top views of FIGS. 32A–32B which depict counterclockwise rotation of permanent magnet rotor member 702 through one-hundred eighty degrees. In FIG. 32A stator pole piece path portion 658A of component 651 is active and stator pole piece path portion 658B is not active, which may be achieved by energizing control coil 660 in a permanent magnet magnetic flux aiding manner or by energizing control coil 662 in a permanent magnet magnetic flux opposing manner. Stator pole piece path portion 676B of component 670 is active and stator pole piece path portion 676A is not active, which may be achieved by energizing control coil 680 in a permanent magnet magnetic flux aiding manner or by energizing control coil 678 in a permanent magnet magnetic flux opposing manner. Thus, portions 690 and 692 of permanent magnet rotor member 702, which both have a north magnetic polarity, will be repelled by the north polarity of stator pole piece path portions 658A and 676B aligned therewith. Portions 694 and 696 of permanent magnet rotor member 702, both of which have a south magnetic polarity, will be attracted to the active path portions 658A and 676B. At the instant that rotor member portion 694 becomes aligned with stator pole piece path portion 658A, as shown in FIG. 32B, all coils are de-energized such that all pole piece path portions will be active as shown. Pole piece path portions 658B and 676A are then kept active while pole piece path portions 658A and 676B are made inactive. This is achieved by energizing control coils 662 and 678 in a permanent magnet magnetic flux aiding manner or by energizing control coils 660 and 680 in a permanent magnet magnetic flux opposing manner. Rotor member portions 690 and 692 will again be repelled by the north polarity of path portions 658B and 676A aligned therewith such that rotation of permanent magnet rotor 702 is continued. In FIG. 32D all coils are shown de-energized when rotor portion 692 aligns with pole piece path portion 658A. By continuing this timed sequence of energization and de-energization of the control coils, continued rotary movement is achieved. As explained above, the initial direction of rotation can be controlled by circuit means which detects the initial direction of permanent magnet rotor 702 and immediately alters the coil energization scheme if the initial direction is incorrect.

A side view of assembled motor 650 is shown in FIG. 33 and includes an upper housing or enclosure portion 710, a bottom housing portion 712, upper bearing 714, and a lower bearing 716.

A fourth embodiment of a rotary motion device or motor 740 is illustrated in FIGS. 34–39. Motor 740 includes five stator control components 742A–742E positioned around a ring shaped permanent magnet rotor member 744 (FIG. 36). As shown with reference to component 742A in FIG. 37 each stator component 742A includes a permanent magnet 746A with an upper pole piece 748A positioned adjacent one pole face thereof and a lower pole piece 750A positioned adjacent the opposite pole face thereof. Control coils 752A, 754A are positioned along respective pole pieces 748A, 750A. A bypass 756A extends from pole piece 748A to pole piece 750A and is positioned between permanent magnet 746A and control coils 752A, 754A. Alternatively, bypass 756A could be provided on the opposite side of permanent magnet 746A as shown in FIG. 38. Although not shown, it is anticipated that permanent magnet rotor member 744 would be mounted on an axis for rotation therewith and that a motor housing or enclosure could be provided, such as shown in relation to motor 650 of FIG. 33.

Figures 39A, 39B, 39C, 39D:
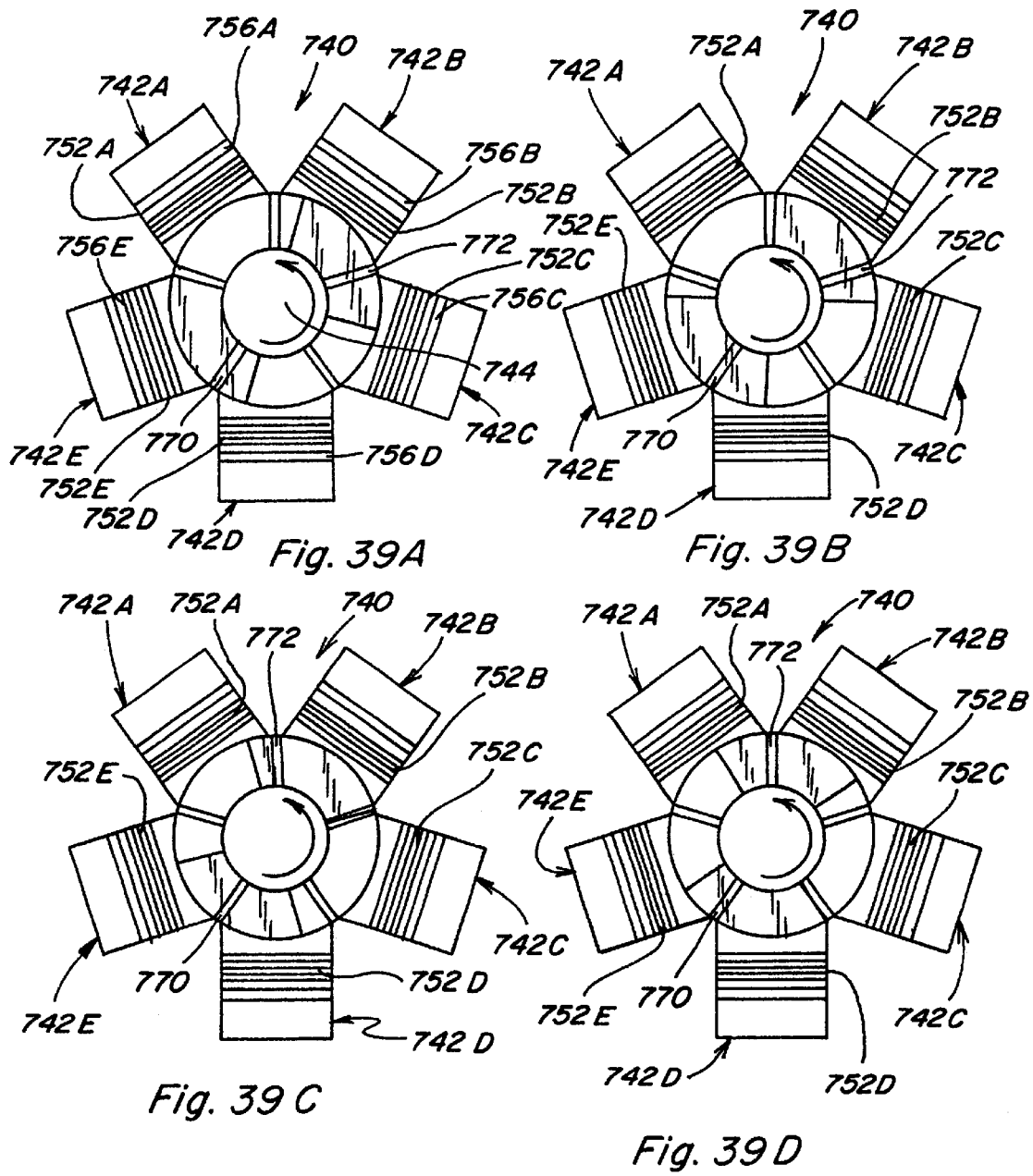

Referring to the top views of FIGS. 39A–39D, rotary motion of rotor member 744 is depicted by the sequence of views. Regions 770 and 772 in FIGS. 39A–39D represent the magnetic north regions of the top of permanent magnet rotor 744. In FIG. 39A control coils 752E and 752C are energized in a permanent magnet aiding and exceeding manner such that regions 770 and 772 of permanent magnet rotor 744 are repulsed by components 742E and 742C while permanent magnet motor regions 774 and 776 are attracted by components 742E and 742C. The resultant coupling forces act to move permanent magnet rotor in a counter-clockwise direction to the location shown in FIG. 39B. Just after permanent magnet rotor region 772 passes the point shown in FIG. 39C, control coil 752B is energized in a permanent magnet aiding and exceeding manner, while control coils 752E and 752C also remain energized, and counterclockwise rotation of permanent magnet rotor 744 is continued. Just after permanent magnet rotor region 772 passes by control component 742C control coil 752C is de-energized, while control coils 752E and 752B remain energized, so as to continue counterclockwise rotation. Then, just after permanent magnet rotor region 770 reaches the location shown in FIG. 39D control coil 752D is energized in a permanent magnet flux aiding and exceeding manner, while coils 752E and 752B remain energized, so as to continue counterclockwise rotation. Thus, as in the other embodiments, repeated and timed energization and de-energization of the control coils produces the desired rotational movement.

In terms of controlling the energization of coils in the devices described above, various electronic control circuit/switching means and electromechanical control circuit/switching machines are depicted in FIGS. 40–44. In circuit 800 of FIG. 40 a given coil 802 is placed in series between an electrical energy source 804 and a power mosfet 806. An LED 808 is connected to electrical energy source 804 through resistor 810 and is positioned to impinge upon a phototransistor 812 which is connected in series with resistor 814. A control input of mosfet 806 is connected between phototransistor 812 and resistor. Accordingly, when LED 808 activates phototransistor 812 the voltage drop across resistor 814 activates, or turns ON, mosfet 806 and coil 802 is energized. Timed energization of coil 802 is provided by mounting an interrupter 816, such as shown in FIG. 42, to the shaft 816 of the motor device to be controlled, such that as interrupter 814 rotates with shaft 816 coil 802 is alternately energized and de-energized. In a device with a plurality of coils a corresponding plurality of LED/photoresistor pairs may be provided.

In circuit 820 of FIG. 41 a coil 822 is positioned between electrical energy source 824 and power mosfet 826. A hall switch 828 is connected in series with resistor 830. Hall switch 828 is also connected to the control input of mosfet 826 through resistor 832. In a given device hall switch 828 would be positioned to react to a change in magnetic flux so as to control the ON/OFF switching of mosfet 826, and thus the alternate energization and de-energization of coil 822.

In FIG. 43 a circuit 840 for controlling two coils in an opposite manner is provided such that when coil 842 is energized coil 844 is de-energized, and such that when coil 842 is de-energized coil 844 is energized. Both coils 842 and 844 are connected in series between electrical energy source 846 and respective power mosfets 848 and 850. An LED 852 and phototransistor 854 arrangement is provided, LED connected in series with resistor 856 and phototransistor connected in series with resistor 858. When LED 852 turns phototransistor 854 ON the voltage drop across resistor 858 turns mosfet 848 ON and coil 842 is energized. At that time the voltage applied at the control input of mosfet 850 will be low and therefore mosfet 850 will be OFF and coil 844 will be de-energized. When interrupter 814 blocks LED 852, phototransistor 854 is turned OFF and mosfet 848 is likewise turned OFF. The control input of mosfet 850 is therefore pulled high through resistor 860 and mosfet 850 is turned ON such that coil 844 is energized.

In a FIG. 44 a system 870 including member 872 mounted on rotating shaft 874 is provided, with the left side of member 872 being alternately conductive at 876 and non-conductive at 878. Coils 880 and 882 are connected to respective brushes 884 and 886 which are positioned to contact member 872 during rotation thereof. Member 872 is connected through brush 890 to power supply 888. Thus, coils 880 and 882 will alternatingly be energized and de-energized as the respective brushes thereof contact the conductive and non-conductive portions of member 872.

Any of such circuit means, variations thereof, or other circuit means may be used to provide the timed energization of the control coils in the various embodiments of the present invention.

From the preceding description of the illustrated embodiments, it is evident that the objects of the invention are attained. Although the invention has been described and illustrated in detail, it is to be clearly understood that the same is intended by way of illustration and example only and is not to be taken by way of limitation.

For example, although the magnetic flux control techniques of the present invention have been discussed as applicable mainly to various motive applications, such magnetic flux control techniques are also useful in static applications.

Power Conversion

Figure 45:
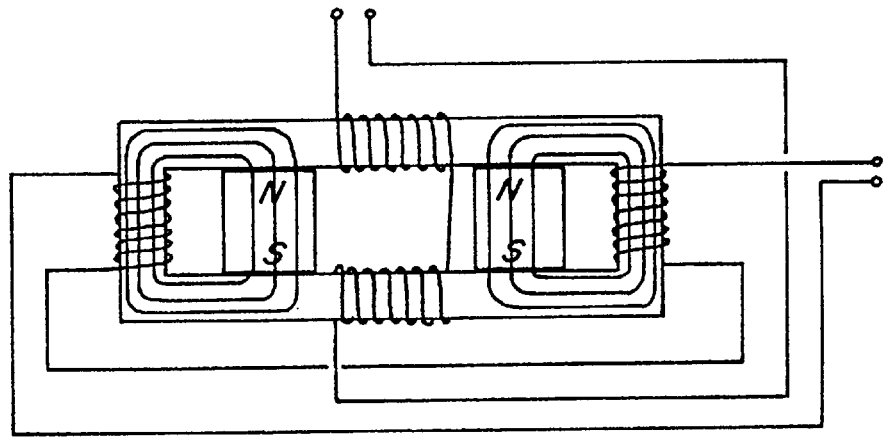
Figure 45:
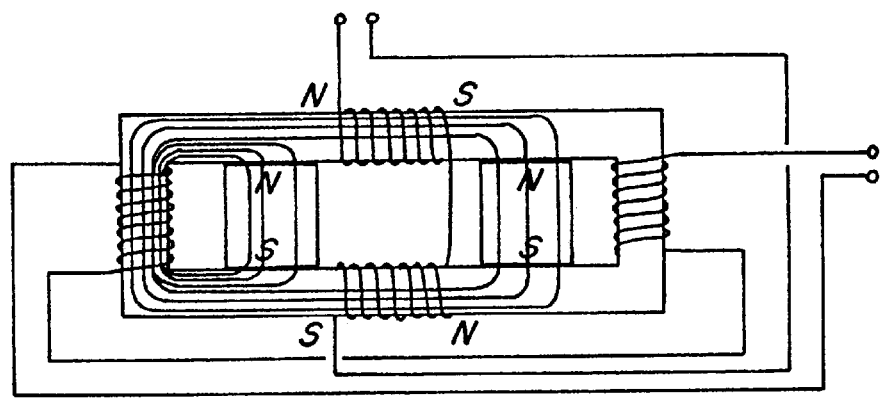
Figure 45:
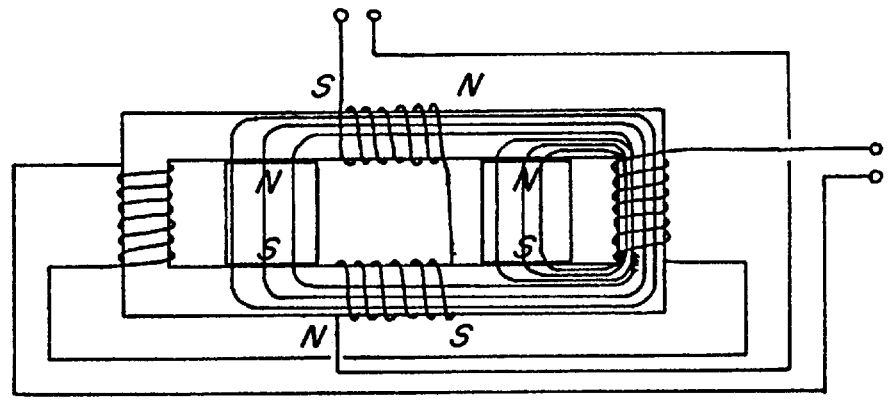

Referring to FIGS. 45A–45C there is shown the permanent magnet device 900 of FIGS. 45A–45C that has two magnetic flux paths provided by rectangular pole piece 902 which includes upper portion 904 and lower portion 906 each positioned against a respective pole face of permanent magnet 910. Unlike the device of FIGS. 7–9, fall away armatures are not provided. Rather, fixed armatures in the form of integral pole piece portions 912 and 914 extend from upper portion 904 to lower portion 906 completing the two flux paths in a permanent manner. Control coils 916, 918 are provided along one flux path and control coils 920, 922 are provided along the other flux path, such control coils acting as primary windings in device 900. One coil 924 is positioned around pole piece portion 912 and another coil 926 is positioned around pole piece portion 914, such coils 924, 926 acting as secondary windings in device 900.

In FIG. 45A coils 916, 918 are energized in a permanent magnet magnetic flux aiding manner so as to couple with all the magnetic flux of permanent magnet 910. All magnetic flux flows along path 930 as shown and thus couples with coil 924. In FIG. 45B no coils are energized and the permanent magnet magnetic flux splits evenly between paths 930 and 932, coupling with both coil 924 and coil 926. In FIG. 45C coils 920, 922 are energized in a permanent magnet magnetic flux aiding manner such that all magnetic flux traverses path 932 and couples with coil 926. In FIG. 45D no coils are energized as in FIG. 45B. By continuously alternatingly energizing and de-energizing coils 916, 918 and 920, 922 in such a manner energy conversion is achieved due to the coupling with coils 924 and 926. The magnetic flux in the integral pole piece portions 912 and 914, and thus the flux coupling with respective coils 924 and 926, varies by a factor of twice the amount of magnetic flux generated by energizing coils 916, 918 and 920, 922.

The construction shown in FIGS. 45A and 45X are similar to the construction shown in FIGS. 7 and 47. The difference in both cases relates to replacing the two flux paths and armatures with one continues flux path. The arrangement in FIG. 7 has one permanent magnet and four coils and the arrangement in FIG. 47 has two permanent magnets and two coils. Although the physical aspects of the two arrangements and the details of the flux control vary, the control method for varying the permanent magnets flux are similar and will be described simultaneously and only differences will be pointed out.

With continuous flux paths the static flux from the permanent magnet or magnets is useless. However, if the static flux of the permanent magnet confined to the flux paths were modified to be time varying it would have utility for electromagnetic induction devices for power conversion like transformers and power inverters. However, the same basic method for controlling the flux of a permanent magnet to provide linear and rotary motion can also be applied to time varying the static flux from the permanent magnetic. The construction shown in FIG. 45X utilizes four control coils and a single permanent magnet and the construction shown in FIG. 45A uses two control coils and two permanent magnets. The flux that would normally be supplied by a primary winding is supplied by the static flux of the permanent magnet or magnets and the control coils convert this static flux into a time varying flux in a novel way. Both arrangements use two secondary coils, the secondary coils are placed in the region of the continuous flux path that would be occupied by an armature or rotor in the linear or rotary arrangements. The regions of the flux paths that perform work are the same in all cases.

In all cases the control coils can either be wired in series or parallel and the secondary coils can be either wound in series or parallel. More than one secondary coil or secondary coils with multiple taps can be placed in the working regions and further multiple flux paths can be utilized with one or more secondary coils placed in each of the working regions. This is made obvious by the disclosures of the linear and rotary devices herein and based on the fact that the working regions of the flux paths are identical.

FIGS. 45X and 45A also show the paths of the static flux of the permanent magnet or magnets when no current is flowing in the control coils. In the arrangement shown in FIG. 45X the flux from the single permanent magnet divides between the two working areas of the flux path. In the arrangement of FIG. 45A all of the flux of one of the permanent magnets passes through one of the working regions and all of the flux of the second permanent magnet passes through the other working region. Each of the working regions in both cases are occupied by secondary coils.

FIGS. 45Y and 45B show the control coils energized with the polarity shown with respect to the polarity of the permanent magnet or magnets included. In FIG. 45Y the opposing coil blocks the passage of flux from the permanent magnet and the aiding coil couples with the flux of the permanent magnet and therefore all of the flux of the permanent magnet passes through one working region as shown. In FIG. 45A the opposing side of the coil blocks the passage of flux from the permanent magnet on the opposing side of the coil and the aiding side of the coil couples with the flux of the other permanent magnet and therefore all of the flux of both the permanent magnets passes through the working region as shown.

FIGS. 45Z and 45C show the control coils energized with a polarity opposite of that shown in FIGS. 45Y and 45B. The same action occurs and results in all of the permanent magnet or magnets path flux passing through the opposite working regions.

By alternating the polarity of the control coils during one cycle, one working region experiences an increasing flux and the opposite region experiences a decreasing flux and during the next cycle the opposite occurs. This results in the induction of a voltage in the secondary coils that is decided by the magnitude of the change in flux in the working region and the time in which this change occurs. The novelty of this discovery is that the primary flux inducing the voltage in the secondary coils is supplied by the permanent magnet or magnets and is far greater than the flux supplied by the control coils.

Further, in the rotary motion devices of FIGS. 31 and 34, it is not necessary that respective rotor members 702 and 744 be formed of permanent magnets. Each could take the form shown in FIG. 46 where sections 950 and 952 are formed of magnetic material such as soft iron and sections 954 and 956 are formed by a non-magnetic filler material.

FIGS. 47 and 48 show another embodiment 1000 of the subject device. The embodiment 1000 includes two spaced permanent magnets 1002 and 1004 each of which has its north pole adjacent the upper surface and its south pole adjacent the lower surface. A magnetizable bridging member 1006 extends across and makes contact with the north magnetic poles of the magnets 1002 and 1004 and another magnetizable bridging member 1008 makes contact with the south magnetic poles of the two permanent magnets 1002 and 1004. The members 1006 and 1008 extend slightly beyond the opposite sides of the respective permanent magnets 1002 and 1004 and a pair of spaced armature members 1010 and 1012 are positioned to move into and out of engagement with the ends of the members 1006 and 1008. Coils 1014 and 1016 are mounted respectively on the members 1006 and 1008 in the space between the permanent magnets 1002 and 1004, and the armatures 1010 and 1012 are shown connected together by a rod 1018 which enables them to move backwards and forwards into engagement with the respective members 1006 and 1008 when different voltages are applied to the respective coils 1014 and 1016. In FIGS. 47, the coils 1014 and 1016 are energized as shown with the coil 1014 having its north magnetic end to the left and its south magnetic end to the right and the opposite is true of the coil 1016. In FIG. 48, the voltage applied to the respective coils 1014 and 1016 is reversed so that the polarity of the left end of coil 1014 is south and the polarity of the opposite end of the same coil 1014 is a north magnetic pole. The reverse is true of the coil 1016. It is to be noted in FIGS. 47 and 48 that the relationship of aiding and opposing is indicated on the figures to indicate the relationship when the coils are energized. For example, in FIG. 47 when the coils are energized as shown the relationship is opposing for the permanent magnet 1002 and is aiding with respect to the permanent magnet 1004. The reverse is true when the voltage on the coils is reversed as shown in FIG. 48. By properly timing the voltage on the respective coils the movement of the armature is controlled. The same principles can be applied to produce rotating movement as shown in FIG. 42.

FIG. 49 shows another embodiment 1030 of the subject invention using principles similar to those described in connection with FIGS. 47 and 48. The embodiment 1030 includes a plurality, three being shown, of stationary members 1032, 1034 and 1036. The details of these members are better shown in FIG. 50 which shows the details of the member 1036. This member includes a pair of permanent magnets 1038 and 1040, each of which has magnetizable members mounted adjacent opposite sides thereof as in the previous construction. The members 1042 and 1044 also have coils 1046 and 1048, respectively, and the coils are energized as described in connection with FIGS. 47 and 48 to produce aiding and opposing magnetism. The construction shown in FIG. 49 may have three stator portions as shown or it may have more stator portions as desired. The rotor 1050 is positioned in the space between the members 1032, 1034 and 1036 and includes a permanent magnet portion part of which has its north magnetic pole on the surface as shown and the other parts has its south magnetic pole in the same surface as shown. The permanent magnets 1038 and 1040 on the stators interact with the permanent magnets on the rotor to produce the rotating motion and is controlled by the energizing of the coils.

Other applications and advantages of the devices and methods of the present invention exist and various modifications are possible, and therefore the present invention is not intended to be limited to the specific examples disclosed herein. Accordingly, the spirit and scope of the invention are to be limited only by the terms of the appended claims.

What is claimed is:

1. A permanent magnet device, comprising a permanent magnet having north and south pole faces, a first pole piece, a second pole piece, a first control coil, a second control coil, and circuit means, the first pole piece positioned adjacent the north pole face of the permanent magnet and including a first path portion, a second path portion and a third portion, the first path portion extending beyond a perimeter of the north pole face in one direction and the second path portion extending beyond the perimeter of the north pole face in another direction to define first and second flux paths for magnetic flux emanating from the north pole face of the permanent magnet, the first path portion of the first pole piece connected to the second path portion of the first pole piece by the third portion which extends across the north pole face of the permanent magnet, the second pole piece positioned adjacent the south pole face and including a first path portion and a second path portion, the first path portion extending beyond a perimeter of the south pole face and substantially aligned with the first path portion of the first pole piece, the second path portion extending beyond the perimeter of the south pole face and substantially aligned with the second path portion of the first pole piece, the first control coil positioned around the first path portion of the first pole piece, the second control coil positioned around the second path portion of the first pole piece, the circuit means connected to each of the first control coil and the second control coil to alternatingly energize the first coil and the second coil in a timed sequential manner.

2. The permanent magnet device as set forth in claim 1, wherein the first control coil and the second control coil are alternatingly energized in a permanent magnet magnetic flux aiding manner.

3. The permanent magnet device as set forth in claim 1, wherein the first control coil and the second control coil are alternatingly energized in a permanent magnet magnetic flux opposing manner.

4. The permanent magnet device as set forth in claim 1, further comprising a rotor member mounted on a shaft for rotation therewith, the rotor member sized, shaped, and positioned to extend substantially from the first path portion of the first pole piece to the first path portion of the second pole piece during at least some part of its rotation.

5. The permanent magnet device as set forth in claim 4, wherein the rotor member is formed by at least one permanent magnet.

6. The permanent magnet device as set forth in claim 1, wherein the second path portion of the first pole piece and the second path portion of the second pole piece are positioned alongside the first path portion of the first pole piece and the first path portion of the first pole piece.

7. The permanent magnet device as set forth in claim 1, further comprising a first bypass extending from the first path portion of the first pole piece to the first path portion of the second pole piece, one end of the first bypass positioned adjacent the first path portion of the first pole piece and between the permanent magnet and the first control coil.

8. The permanent magnet device as set forth in claim 6, further comprising a second bypass extending from the second path portion of the first pole piece to the second path portion of the second pole piece, one end of the second bypass positioned adjacent the second path portion of the first pole piece and between the permanent magnet and the second control coil.

9. The permanent magnet device as set forth in claim 1, further comprising a plurality of armatures arranged to define a path of movement, wherein the second path portion of the first pole piece and the second path portion of the second pole piece are positioned alongside the first path portion of the first pole piece and the first path portion of the second pole piece, and wherein all of such pole piece path portions include an end face positioned adjacent the path of movement defined by the plurality of armatures.

10. The permanent magnet device as set forth in claim 1, wherein the first control coil and the second control coil are simultaneously energized one in a permanent magnet magnetic flux aiding manner and one in a permanent magnet magnetic flux opposing manner.

11. The permanent magnet device as set forth in claim 1, further comprising two shaft connected armatures positionable adjacent the ends of the first and second pole pieces, wherein each of the armatures is formed by a permanent magnet.

12. The permanent magnet device of claim 1 further comprising a first fixed armature extending between the first path portion of the first pole piece to the first path portion of the second pole piece and a second fixed armature extending between the second path portion on the first pole piece to the second path portion of the second pole piece.

13. The permanent magnet device of claim 12 where a first secondary coil is wrapped around the first fixed armature and a second secondary coil is wrapped around the second fixed armature.

14. The permanent magnet device of claim 13 including circuit means connected to the control coils to control the energizing thereof to produce a varying flux in the armatures and to induce voltage in the secondary coils.

15. The permanent magnet device of claim 1 wherein there are at least two permanent magnets each having north and south pole faces, the first pole piece being positioned extending between the north pole faces of the permanent magnets and the second pole piece positioned extending between adjacent south pole faces of the permanent magnets.

16. A method for controlling the path of magnetic flux from a permanent magnet, the method comprising the steps of:
   (a) placing a first pole piece adjacent a first pole face of the permanent magnet so as to have at least first and second path portions extending beyond a perimeter of the first pole face;
   (b) placing a second pole piece adjacent a second pole face of the permanent magnet so as to include at least one portion which substantially aligns with the first and second path portions of the first pole piece;
   (c) placing a first control coil along and around the first path portion of the first pole piece;
   (d) placing a second control coil along and around the second path portion of the first pole piece;
   (e) repeatedly energizing the first control coil in a permanent magnet magnetic flux opposing manner so as to prevent magnetic flux of the permanent magnet from traversing the first path portion of the first pole piece; and
   (f) repeatedly energizing the second control coil in a permanent magnet magnetic flux opposing manner so as to prevent magnetic flux of the permanent magnet from traversing the second path portion of the first pole piece.

17. The method as set forth in claim 16 wherein the energization of steps (e) and (t) take place in a simultaneous manner.

18. A method for controlling the path of magnetic flux from a permanent magnet, the method comprising the steps of:
   (a) placing a first pole piece adjacent a first pole face of the permanent magnet so as to have at least first and second path portions extending beyond a perimeter of the first pole face;
   (b) placing a second pole piece adjacent a second pole face of the permanent magnet so as to include at least one portion which substantially aligns with the first and second path portions of the first pole piece;
   (c) placing a first control coil along and around the first path portion of the first pole piece;
   (d) placing a second control coil along and around the second path portion of the first pole piece; and
   (e) alternatingly performing the following steps in a repeated manner:
      (i) energizing the first control coil in a permanent magnet magnetic flux aiding manner so as to couple with substantially all magnetic flux of the permanent magnet such that substantially no magnetic flux of the permanent magnet traverses the second path portion of the first pole piece when the first control coil is so energized; and
      (ii) energizing the second control coil in a permanent magnet magnetic flux opposing manner so as to couple with substantially all magnetic flux of the permanent magnet such that substantially no magnetic flux of the permanent magnet traverses the first path portion of the first pole piece when the second control coil is so energized.

19. A method for controlling the path of magnetic flux from a permanent magnet the method comprising the steps of:
   (a) placing a first pole piece adjacent a first pole face of the permanent magnet so as to have at least first and second path portions extending beyond a perimeter of the first pole face;
   (b) placing a second pole piece adjacent a second pole face of the permanent magnet so as to include at least one portion which substantially aligns with the first and second path portions of the first pole piece;
   (c) placing a first control coil along and around the first path portion of the first pole piece;
   (d) placing a second control coil along and around the second path portion of the first pole piece; and
   (e) alternatingly performing the following steps in a repeated manner:
      (i) simultaneously energizing the first control coil in a permanent magnet magnetic flux aiding manner and the second control coil in a permanent magnet flux opposing manner; and
      (ii) simultaneously energizing the first control coil in a permanent magnet flux opposing manner and the second control coil in a permanent magnet magnetic flux aiding manner.

20. A rotary motion device, comprising a rotor assembly including a shaft which defines an axis of rotation of the assembly, a rotor pole piece mounted for rotation with the shaft, the rotor pole piece including an outer ring portion having at least two path portions extending inwardly from a periphery of the outer ring portion;
   a stator assembly including a permanent magnet having a generally ring-shaped configuration, a first pole face of the permanent magnet positioned adjacent the outer ring portion of the rotor pole piece, the stator assembly further comprising a stator pole piece including an outer ring portion positioned adjacent a second pole face of the permanent magnet and having a plurality of path portions extending inwardly from the periphery, each path portion further including a respective portion which extends toward a plane defined by the first pole face of the permanent magnet and alignable with each of the rotor pole piece path portions at certain rotational positions of the rotor pole piece, each path portion including a control coil positioned therealong;
   and circuit means connected to each of the coils and including a source of electrical energy and switch means for energizing respective ones of the control coils in a predetermined timed sequence based upon rotation of the rotor assembly.

21. A rotary motion device, comprising:
   a rotor assembly including a shaft which defines an axis of rotation of the assembly, a pair of spaced elongated rotor members mounted on the shaft at spaced locations thereon and angularly oriented with respect to each other, each of the elongated rotor members formed of a magnetic material;
   a stator assembly including a permanent magnet having opposed first and second pole faces, a first pole piece positioned adjacent the first pole face and a second pole piece positioned adjacent the second pole face, each pole piece including a respective first path portion extending beyond a perimeter of its adjacent pole face and having an arcuate shaped end portion, the first path portion of the first pole piece aligned with the first path portion of the second pole piece, each pole piece further including a respective second path portion extending beyond the perimeter of its adjacent pole face in a direction opposite to that of the first path portions and having an arcuate shaped end portion, the second path portion of the first pole piece aligned with the second path portion of the second pole piece, at least one of the first path portions of the first pole piece and the first path portion of the second pole piece including a control coil mounted on at least one of the pole pieces, at least one of the second path portions of the first pole piece and the second path portion of the second pole piece including a control coil mounted on at least one of the pole pieces, wherein the rotor assembly extends from end to end of the stator assembly such that the elongate members are aligned with the arcuate shaped end portions of the path portions of the pole pieces;

and circuit means connected to each of the coils and including a source of electrical energy and switch means for energizing respective ones of the control coils in a predetermined timed sequence based upon rotation of the rotor assembly.

22. A rotary motion device comprising:

a rotor assembly including a shaft which defines an axis of rotation of the assembly, a ring-shaped rotor member mounted for rotation with the shaft, the ring-shaped rotor member including a plurality of distinct circumferential regions;

a stator assembly including a first permanent magnet, a first pole piece positioned against a first pole face and a second pole piece positioned against a second pole face, the first pole piece including at least a first path portion extending beyond a perimeter of the first pole face, the second pole piece including at least a first path portion extending beyond a perimeter of the second pole face, the first path portion of the first pole piece aligned with the first path portion of the second pole piece, at least a portion of the ring-shaped rotor member positioned between the first path portion of the first pole piece and the first path portion of the second pole piece, at least one of the first path portions of the first pole piece and the first path portion of the second pole piece including a first control coil positioned at a point intermediate the first permanent magnet and the ring-shaped rotor member;

and circuit means connected to the first control coil and including a source of electrical energy and switch means for energizing the first control coil in a predetermined timed manner based upon rotation of the rotor assembly.

23. The rotary motion device as set forth in claim 22, wherein the ring-shaped rotor member is formed by a permanent magnet having distinct circumferential regions of opposite polarity.

24. The rotary motion device as set forth in claim 23, wherein the first pole piece includes a second path portion spaced from and extending adjacent to the first path portion, the second pole piece including a second path portion spaced from and extending adjacent to the first path portion such that the second path portion of the first pole piece is aligned with the second path portion of the second pole piece, at least a portion of the ring-shaped permanent magnet rotor member positioned between the second path portion of the first pole piece and the second path portion of the second pole piece, at least one of the second path portions of the first pole piece and the second path portion of the second pole piece having a second control coil mounted on at least one of the pole pieces at a point intermediate the first permanent magnet and the ring-shaped permanent magnet rotor member, the second control coil connected to the circuit means so as to be energized in a predetermined timed manner based upon rotation of the rotor assembly.

25. The rotary motion device as set forth in claim 22, wherein the stator assembly further comprises a second permanent magnet, a third pole piece positioned adjacent a first pole face of the second permanent magnet and a fourth pole piece positioned adjacent a second pole face of the second permanent magnet, the third pole piece including at least a first path portion extending beyond a perimeter of the second permanent magnet first pole face, the fourth pole piece including at least a first path portion extending beyond a perimeter of the second permanent magnet second pole face, the first path portion of the third pole face aligned with the first path portion of the fourth pole piece, at least a portion of the ring-shaped permanent magnet rotor member positioned between the first path portion of the third pole piece and the first path portion of the fourth pole piece, at least one of the first path portions of the third pole piece and the first path portion of the fourth pole piece including a third control coil mounted on at least one of the pole pieces at a point intermediate the second permanent magnet and the ring-shaped permanent magnet rotor member, the third pole piece including a second path portion spaced from and extending adjacent to the first path portion the fourth pole piece including a second path portion spaced from and extending adjacent to the first path portion thereof such that the second path portion of the third pole piece is aligned with the second path portion of the fourth pole piece, at least a portion of the ring-shaped permanent magnet rotor member positioned between the second path portion of the third pole piece and the second path portion of the fourth pole piece, at least one of the second path portions of the third pole piece and the second path portion of the fourth pole piece including a fourth control coil mounted on at least one of the pole pieces at a point intermediate the second permanent magnet and the ring-shaped permanent magnet rotor member, wherein each of the third and fourth control coils are connected to the circuit means so as to be energized in a predetermined timed manner based upon rotation of the rotor assembly.

26. A device for producing rotary motion comprising:

a rotor assembly including a shaft which defines an axis of rotation for the assembly, a ring-shaped rotor member mounted for rotation with the shaft, the ring-shaped rotor member having a plurality of distinct circumferentially positioned regions extending around the axis, a stator assembly including a first permanent magnet, a first pole piece positioned against the first pole face of the first pole piece and a second pole piece positioned against a second pole face of the first pole piece, the first pole piece including at least a first path portion extending beyond a perimeter of the first pole face, the second pole piece including at least a first path portion extending beyond the perimeter of the second pole face, the first path portion of the first pole piece aligned with the first path portion of the second pole piece, at least a portion of the ring-shaped rotor member positioned between the first path portion of the first pole piece and the first path portion of the second pole piece, at least one of the first path portions of the first pole piece and the first path portion of the second pole piece including a first control coil mounted on at least one of the pole pieces at a point intermediate the first permanent magnet and the ring-shaped rotor member; and circuit means connected to the first control coil and including a source of electrical energy and switch means for energizing the first control coil in a predetermined timed manner based upon position of the rotor assembly during rotation of the rotor assembly.

27. The device for producing rotary motion of claim 26 wherein the circuit means includes means for timing the energizing of the first control coil includes means for adjusting the timing thereof.

28. The device for producing rotor motion of claim 26 including means to vary the flux generated in the first and second pole pieces.

29. A device for handling the flux between two separate permanent magnets each of which has a north magnetic pole adjacent one side face and the south magnetic pole adjacent to the opposite side face, the north and south side pole faces respectively of both magnets being substantially in alignment, a first member in surface-to-surface contact with the north magnetic faces of the spaced permanent magnets, a second member in surface-to-surface contact with the south magnetic faces of the spaced permanent magnets, first and second armatures each positioned adjacent opposite ends of the first and second permanent magnets and adjacent to opposite ends of the spaced members, a coil mounted on each of the members in the space between the adjacent permanent magnets, and means for applying voltages of predetermined polarities across the respective coils to change the magnetic coupling between the permanent magnets and between the armatures.

30. A device for producing rotational movement comprising:

a rotor having a shaft rotatable about the axis thereof, a member constructed of permanent magnets mounted on the shaft, said member having circumferential portions some of which have a north magnetic pole and others a south magnetic pole adjacent to the same side thereof, the opposite surface of the permanent magnet member having north magnetic poles opposite the south magnetic poles and south magnetic poles opposite the north magnetic poles, a stator having a plurality of circumferentially spaced portions each of which includes at least one permanent magnet and a pair of members mounted adjacent opposite sides of the permanent magnets, the members being positioned adjacent to the periphery of the rotor permanent magnet member and means on the member adjacent each opposite side of the stator permanent magnet for mounting a coil, and means for energizing the coil on each stator portion in sequence to produce magnetic coupling force between the stator and the rotor in a direction to produce rotating motion of the rotor.

31. A device including a rotating member and a stationary member, each having a permanent magnet portion positioned to produce magnetic coupling force therebetween in predetermined positions thereof, the rotor including a shaft rotatable about its axis and the permanent magnet extending around the shaft and formed by a plurality of adjacent portions of permanent magnet material whereby adjacent portions have their north and south magnetic pole faces on opposite sides of the rotor permanent magnet, a plurality of stator members each stator member having at least one permanent magnet having a north magnetic pole adjacent one side and a south magnetic pole adjacent to the opposite side, a pair of members positioned adjacent respective opposite sides of the stator permanent magnet in position to extend to adjacent the rotor permanent magnet whereby a flux path is formed between the members and the stator and rotor permanent magnets, a coil mounted on each member of the stator and means for applying a voltage of predetermined polarity to each of said coils to control the flux through a path between the permanent magnets and to control the coupling force between the permanent magnets on the stator and the permanent magnets on the rotor.

32. A motion producing device comprising at least one permanent magnet having a north pole opposite and spaced from a south pole, a pair of spaced substantially parallel members adjacent respectively the north and south poles of the at least one permanent magnet and extending outwardly to substantially aligned opposite edges, a flux supporting member positioned adjacent the respective opposite edges of each pair of parallel members, a coil on selected ones of the parallel members, and a source of electrical energy connected to each of the coils for energizing the coils to change the flux in the parallel members and in the flux supporting members.

33. The motion producing device of claim 32 wherein there are at least two spaced permanent magnets extending between the parallel members.

34. The motion producing device of claim 32 wherein one of said pair of parallel members is subdivided into a plurality of sidewardly extending portions extending to one of said opposite side edges, at least one of said coils being positioned on at least one of said sidewardly extending portions.

35. The motion producing device of claim 34 wherein there are coils on a plurality of respective ones of the sidewardly extending portions.

36. The motion producing device of claim 32 wherein the permanent magnet and the parallel members are annular in shape.

37. The motion producing device of claim 32 including a by-pass member extending between the pair of spaced substantial parallel members adjacent one side of the permanent magnet.

38. A permanent magnet device comprising at least two permanent magnets each having north and south pole faces, a first pole piece, a second pole piece, a first control coil, a second control coil and circuit means, the first pole piece positioned adjacent the north pole faces of the at least two permanent magnets and including a first path portion, a second path portion and a third path portion, the first path portion extending beyond the perimeter of the north pole faces and the second path portion extending beyond the perimeter of the north pole faces to define first and second flux paths for magnetic flux emitting from the north pole faces of the at least two permanent magnets, the first path portion of the first pole piece connected to the second path portion of the first pole piece by a third portion which extends across the north pole face of the at least two permanent magnets, the second pole piece positioned adjacent to the south pole faces of the at least two permanent magnets and including a first path portion and a second path portion, the first path portion extending beyond a perimeter of the south pole faces and substantially aligned with the first path portion of the first pole piece, the second path portion extending beyond the perimeter of the south pole faces and substantially aligned with the second path portion of the first pole piece, the first control coil positioned around the first path portion of the first pole piece, the second control coil positioned around the second path portion of the first pole piece, and the circuit means connected to each of the first control coil and the second control coil to alternatingly energize the first coil and the second coil in a timed sequential manner.

39. The permanent magnet device of claim 38 further comprising a first fixed armature extending between the first path portion of the first pole piece to the first path portion of the second pole piece and a second fixed armature extending between the second path portion of the first pole piece to the second path portion of the second pole piece.

40. The permanent magnet device of claim 39 where a first secondary coil is wrapped around the first fixed armature and a second secondary coil is wrapped around the second fixed armature.

41. The permanent magnet device of claim 40 including circuit means connected to the control coils to control the energizing thereof to produce a varying flux in the armatures and to induce voltage in the secondary coils.

42. The permanent magnet device of claim 38 wherein there are at least two permanent magnets each having north and south pole faces, the first pole piece being positioned extending between the north pole faces of the permanent magnets and the second pole piece positioned extending between the south pole faces of the permanent magnets.

* * * * *

UNITED STATES PATENT AND TRADEMARK OFFICE
CERTIFICATE OF CORRECTION

PATENT NO. : 6,246,561 B1  
DATED : June 12, 2001  
INVENTOR(S) : Charles J. Flynn Page 1 of 1

It is certified that error appears in the above-identified patent and that said Letters Patent is hereby corrected as shown below:

Column 3,
Line 53, "Figs 10, 10A-H" should be -- Figs. 10A-H --.
Line 56, "Figs 11, 11A-F" should be -- Figs. 11A-F --.
Line 61, "Figs 12, 12A-E" should be -- Figs. 12A-E --.

Column 4,
Line 4, "Figs. 16A-E" should be -- Fig. 16 --.

Signed and Sealed this

Twenty-ninth Day of January, 2002

Attest:

Attesting Officer

JAMES E. ROGAN
*Director of the United States Patent and Trademark Office*